(12) United States Patent
Downey et al.

(10) Patent No.: US 9,712,788 B2
(45) Date of Patent: *Jul. 18, 2017

(54) REQUEST FOR INFORMATION RELATED TO BROADCAST NETWORK CONTENT

(75) Inventors: David Downey, Sherman, CT (US); Bruce J. Anderson, Yardville, NJ (US); Daniel C. Wilson, Edmonton (CA)

(73) Assignee: INVIDI Technologies Corporation, Princeton, NJ (US)

( * ) Notice: Subject to any disclaimer, the term of this patent is extended or adjusted under 35 U.S.C. 154(b) by 901 days.

This patent is subject to a terminal disclaimer.

(21) Appl. No.: 13/418,121

(22) Filed: Mar. 12, 2012

(65) Prior Publication Data

US 2013/0042285 A1     Feb. 14, 2013

Related U.S. Application Data

(63) Continuation of application No. 12/467,890, filed on May 18, 2009, now Pat. No. 8,146,126, which is a
(Continued)

(51) Int. Cl.
*H04N 5/445*     (2011.01)
*H04N 7/173*     (2011.01)
(Continued)

(52) U.S. Cl.
CPC ..... *H04N 7/17318* (2013.01); *G06Q 30/0251* (2013.01); *H04N 21/2543* (2013.01);
(Continued)

(58) Field of Classification Search
CPC ........... H04N 7/17318; H04N 21/2543; H04N 7/44222; H04N 7/47202; H04N 7/6582;
(Continued)

(56) References Cited

U.S. PATENT DOCUMENTS 4,331,974 A     5/1982    Cogswell et al.
4,573,072 A     2/1986    Freeman
(Continued)

FOREIGN PATENT DOCUMENTS

EP              09/30784         7/1999
KR         10-2007-0024039       3/2007
(Continued)

*Primary Examiner* — Junior Mendoza
(74) *Attorney, Agent, or Firm* — Marsh Fischmann & Breyfogle LLP

(57) ABSTRACT

A request for information (RFI) system is provided a viewer of a cable television network enters an RFI input (1) to a digital set top box using a user remote. Based on this RFI input, the digital set top box transmits a data request (2) to an RFI data center. The RFI data center also receives asset data (3) from an asset database so as to associate the RFI input (1) with a particular asset. An RFI request (4) can then be transmitted to the appropriate asset provider. The asset provider can then provide a package of assets or follow-on information (5) back to the RFI data center. The RFI data center may then, in turn, provide the package of assets or follow-on information to a user data terminal, for example, of the cable television network viewer, via access through a web-portal or e-mail (6).

29 Claims, 11 Drawing Sheets

Related U.S. Application Data continuation-in-part of application No. 12/024,714, filed on Feb. 1, 2008.

(60) Provisional application No. 61/054,034, filed on May 16, 2008, provisional application No. 60/887,750, filed on Feb. 1, 2007.

(51) Int. Cl.
| | |
|---|---|
| G06Q 30/02 | (2012.01) |
| H04N 21/2543 | (2011.01) |
| H04N 21/442 | (2011.01) |
| H04N 21/472 | (2011.01) |
| H04N 21/658 | (2011.01) |
| H04N 21/81 | (2011.01) |

(52) U.S. Cl.
CPC . *H04N 21/44222* (2013.01); *H04N 21/47202* (2013.01); *H04N 21/6582* (2013.01); *H04N 21/812* (2013.01)

(58) Field of Classification Search
CPC .............. H04N 7/812; H04N 21/4122; H04N 21/6582; G06Q 30/0251
See application file for complete search history.

(56) References Cited

U.S. PATENT DOCUMENTS

| | | | |
|---|---|---|---|
| 4,602,279 A | 7/1986 | Freeman | |
| 4,918,516 A | 4/1990 | Freeman | |
| 5,099,319 A | 3/1992 | Esch et al. | |
| 5,155,591 A | 10/1992 | Wachob | |
| 5,231,494 A | 7/1993 | Wachob | |
| 5,260,778 A | 11/1993 | Kauffman et al. | |
| 5,283,639 A | 2/1994 | Esch et al. | |
| 5,381,477 A | 1/1995 | Beyers, II et al. | |
| 5,410,344 A | 4/1995 | Graves | |
| 5,446,919 A | 8/1995 | Wilkins | |
| 5,515,098 A | 5/1996 | Carles | |
| 5,515,858 A | 5/1996 | Myllymaki | |
| 5,534,941 A | 7/1996 | Sie et al. | |
| 5,534,944 A | 7/1996 | Egawa et al. | |
| 5,537,586 A | 7/1996 | Amram et al. | |
| 5,585,858 A | 12/1996 | Harper | |
| 5,600,364 A | 2/1997 | Hendricks et al. | |
| 5,600,366 A | 2/1997 | Schulman | |
| 5,636,346 A | 6/1997 | Saxe | |
| 5,652,615 A | 7/1997 | Bryant et al. | |
| 5,661,516 A | 8/1997 | Carles | |
| 5,661,519 A | 8/1997 | Franetzki | |
| 5,682,195 A | 10/1997 | Hendricks et al. | |
| 5,724,521 A | 3/1998 | Dedrick | |
| 5,740,549 A | 4/1998 | Reilly et al. | |
| 5,754,939 A | 5/1998 | Herz et al. | |
| 5,774,170 A | 6/1998 | Hite et al. | |
| 5,805,974 A | 9/1998 | Hite et al. | |
| 5,818,539 A | 10/1998 | Naimpally et al. | |
| 5,838,678 A | 11/1998 | Davis et al. | |
| 5,848,396 A | 12/1998 | Gerace | |
| 5,859,660 A | 1/1999 | Perkins et al. | |
| 5,872,588 A | 2/1999 | Aras et al. | |
| 5,907,322 A | 5/1999 | Kelly et al. | |
| 5,912,709 A | 6/1999 | Takahashi | |
| 5,917,830 A | 6/1999 | Chen et al. | |
| 5,918,014 A | 6/1999 | Robinson | |
| 5,948,061 A | 9/1999 | Merriman et al. | |
| 5,982,436 A | 11/1999 | Balakrishnan et al. | |
| 5,991,735 A | 11/1999 | Gerace | |
| 6,002,393 A | 12/1999 | Hite et al. | |
| 6,029,045 A | 2/2000 | Picco et al. | |
| 6,049,569 A | 4/2000 | Radha et al. | |
| 6,067,303 A | 5/2000 | Aaker et al. | |
| 6,088,396 A | 7/2000 | Takahashi | |
| 6,088,722 A | 7/2000 | Herz et al. | |
| 6,111,896 A | 8/2000 | Slattery et al. | |
| 6,151,443 A | 11/2000 | Gable et al. | |
| 6,154,496 A | 11/2000 | Radha | |
| 6,181,334 B1 | 1/2001 | Freeman et al. | |
| 6,195,368 B1 | 2/2001 | Gratacap | |
| 6,204,843 B1 | 3/2001 | Freeman et al. | |
| 6,208,691 B1 | 3/2001 | Balakrishnan et al. | |
| 6,216,129 B1 | 4/2001 | Eldering | |
| 6,246,701 B1 | 6/2001 | Slattery et al. | |
| 6,252,873 B1 | 6/2001 | Vines | |
| 6,269,120 B1 | 7/2001 | Boice et al. | |
| 6,298,348 B1 | 10/2001 | Eldering | |
| 6,324,519 B1 | 11/2001 | Eldering | |
| 6,353,929 B1 | 3/2002 | Houston | |
| 6,418,169 B1 | 7/2002 | Datari | |
| 6,438,751 B1 * | 8/2002 | Voyticky | H04H 60/40 725/42 |
| 6,438,752 B1 | 8/2002 | McClard | |
| 6,446,261 B1 | 9/2002 | Rosser | |
| 6,457,010 B1 | 9/2002 | Eldering et al. | |
| 6,463,585 B1 | 10/2002 | Hendricks et al. | |
| 6,487,721 B1 | 11/2002 | Safadi | |
| 6,560,578 B2 | 5/2003 | Eldering | |
| 6,615,039 B1 | 9/2003 | Eldering | |
| 6,637,028 B1 | 10/2003 | Voyticky et al. | |
| 6,684,194 B1 | 1/2004 | Eldering et al. | |
| 6,704,930 B1 | 3/2004 | Eldering et al. | |
| 6,708,335 B1 | 3/2004 | Ozer et al. | |
| 6,714,917 B1 | 3/2004 | Eldering et al. | |
| 6,820,277 B1 | 11/2004 | Eldering et al. | |
| 7,003,792 B1 | 2/2006 | Yuen | |
| 7,039,932 B2 | 5/2006 | Eldering et al. | |
| 7,100,183 B2 | 8/2006 | Kunkel et al. | |
| 7,302,696 B1 * | 11/2007 | Yamamoto | 725/23 |
| 7,552,458 B1 * | 6/2009 | Finseth | G06Q 30/0225 705/14.26 |
| 8,006,261 B1 | 8/2011 | Haberman | |
| 2001/0025245 A1 | 9/2001 | Flickinger et al. | |
| 2001/0032333 A1 | 10/2001 | Flickinger et al. | |
| 2001/0049620 A1 | 12/2001 | Blasko | |
| 2002/0013943 A1 | 1/2002 | Habermann et al. | |
| 2002/0026638 A1 | 2/2002 | Eldering et al. | |
| 2002/0032626 A1 | 3/2002 | DeWolf | |
| 2002/0049727 A1 | 4/2002 | Rothkopf | |
| 2002/0049968 A1 * | 4/2002 | Wilson | H04H 20/103 725/35 |
| 2002/0052779 A1 * | 5/2002 | Landesmann | 705/14 |
| 2002/0053077 A1 | 5/2002 | Shah-Nazaroff et al. | |
| 2002/0056107 A1 | 5/2002 | Schlack | |
| 2002/0059584 A1 | 5/2002 | Ferman et al. | |
| 2002/0072966 A1 | 6/2002 | Eldering et al. | |
| 2002/0083435 A1 | 6/2002 | Blasko et al. | |
| 2002/0083439 A1 | 6/2002 | Eldering et al. | |
| 2002/0083441 A1 | 6/2002 | Eldering et al. | |
| 2002/0083442 A1 | 6/2002 | Eldering | |
| 2002/0083443 A1 | 6/2002 | Eldering et al. | |
| 2002/0083444 A1 | 6/2002 | Blasko et al. | |
| 2002/0083445 A1 | 6/2002 | Flickinger et al. | |
| 2002/0083451 A1 | 6/2002 | Gill et al. | |
| 2002/0087973 A1 | 7/2002 | Hamilton et al. | |
| 2002/0087975 A1 | 7/2002 | Schlack | |
| 2002/0087980 A1 | 7/2002 | Eldering et al. | |
| 2002/0092019 A1 | 7/2002 | Marcus | |
| 2002/0099611 A1 | 7/2002 | De Souza et al. | |
| 2002/0111154 A1 | 8/2002 | Eldering et al. | |
| 2002/0111172 A1 | 8/2002 | DeWolf et al. | |
| 2002/0122430 A1 | 9/2002 | Haberman et al. | |
| 2002/0123928 A1 | 9/2002 | Eldering et al. | |
| 2002/0129368 A1 | 9/2002 | Schlack et al. | |
| 2002/0143901 A1 | 10/2002 | Lupo et al. | |
| 2002/0144262 A1 | 10/2002 | Plotnick et al. | |
| 2002/0144263 A1 | 10/2002 | Eldering et al. | |
| 2002/0178445 A1 | 11/2002 | Eldering et al. | |
| 2002/0178447 A1 | 11/2002 | Plotnick et al. | |
| 2002/0184047 A1 | 12/2002 | Plotnick et al. | |
| 2002/0184130 A1 | 12/2002 | Blasko | |
| 2002/0194058 A1 | 12/2002 | Eldering | |
| 2003/0004810 A1 | 1/2003 | Eldering | |
| 2003/0005437 A1 | 1/2003 | Feuer et al. | |

(56) References Cited

U.S. PATENT DOCUMENTS

| | | |
|---|---|---|
| 2003/0037333 A1 | 2/2003 | Ghashghai et al. |
| 2003/0045957 A1 | 3/2003 | Habermann et al. |
| 2003/0067554 A1 | 4/2003 | Klarfeld et al. |
| 2003/0093792 A1 | 5/2003 | Labeeb et al. |
| 2003/0097299 A1 | 5/2003 | O'Kane |
| 2003/0101454 A1 | 5/2003 | Ozer et al. |
| 2003/0105831 A1 | 6/2003 | O'Kane et al. |
| 2003/0110171 A1 | 6/2003 | Ozer et al. |
| 2003/0115318 A1 | 6/2003 | Wueste |
| 2003/0142689 A1 | 7/2003 | Habermann et al. |
| 2003/0149975 A1 | 8/2003 | Eldering et al. |
| 2003/0200336 A1 | 10/2003 | Pal et al. |
| 2003/0220100 A1 | 11/2003 | McElhatten et al. |
| 2004/0003118 A1 | 1/2004 | Brown et al. |
| 2004/0003398 A1 | 1/2004 | Donian et al. |
| 2004/0015984 A1 | 1/2004 | Yamamoto et al. |
| 2004/0015986 A1 | 1/2004 | Carver et al. |
| 2004/0045020 A1 | 3/2004 | Witt et al. |
| 2004/0117257 A1 | 6/2004 | Habermann |
| 2004/0133909 A1 | 7/2004 | Ma |
| 2004/0181818 A1 | 9/2004 | Heyner et al. |
| 2004/0220893 A1 | 11/2004 | Spivack et al. |
| 2004/0230994 A1 | 11/2004 | Urdang et al. |
| 2004/0243470 A1 | 12/2004 | Ozer et al. |
| 2004/0243623 A1 | 12/2004 | Ozer et al. |
| 2004/0268419 A1* | 12/2004 | Danker ............... H04N 7/173 725/136 |
| 2005/0015803 A1 | 1/2005 | Macrae et al. |
| 2005/0021398 A1 | 1/2005 | McCleskey et al. |
| 2005/0028207 A1 | 2/2005 | Finseth et al. |
| 2005/0034163 A1 | 2/2005 | Nakagawa et al. |
| 2005/0076359 A1 | 4/2005 | Pierson et al. |
| 2005/0076384 A1 | 4/2005 | Upendran et al. |
| 2005/0078088 A1 | 4/2005 | Davis et al. |
| 2005/0080846 A1 | 4/2005 | McCleskey et al. |
| 2005/0097599 A1 | 5/2005 | Plotnick et al. |
| 2005/0132398 A1 | 6/2005 | Baran et al. |
| 2005/0193410 A1 | 9/2005 | Eldering et al. |
| 2005/0210498 A1 | 9/2005 | Scott, III et al. |
| 2005/0228806 A1 | 10/2005 | Haberman |
| 2005/0234992 A1 | 10/2005 | Haberman |
| 2006/0222322 A1 | 10/2006 | Levitan |
| 2006/0287915 A1* | 12/2006 | Boulet ............... G06Q 30/02 705/14.61 |
| 2006/0293954 A1 | 12/2006 | Anderson et al. |
| 2011/0023060 A1* | 1/2011 | Dmitriev ............ G06Q 30/0269 725/34 |

FOREIGN PATENT DOCUMENTS

| | | |
|---|---|---|
| KR | 10-2007-0061601 | 3/2007 |
| WO | 99/21338 | 4/1999 |
| WO | 99/46708 | 9/1999 |
| WO | 00/04706 | 1/2000 |
| WO | 00/17775 | 3/2000 |
| WO | 00/33228 | 6/2000 |
| WO | 00/33233 | 6/2000 |
| WO | 01/17250 | 3/2001 |
| WO | 01/47156 | 6/2001 |

* cited by examiner

REQUEST FOR INFORMATION RELATED TO BROADCAST NETWORK CONTENT

CROSS REFERENCE TO RELATED APPLICATION

This application is a continuation of U.S. patent Ser. No. 12/467,890 (U.S. Pat. No. 8,146,126), entitled "REQUEST FOR INFORMATION RELATED TO BROADCAST NETWORK CONTENT," filed on May 18, 2009, which claims priority under 35 U.S.C. §119 to U.S. Provisional Application No. 61/054,034, entitled "REQUEST FOR INFORMATION RELATED TO BROADCAST NETWORK CONTENT," filed on May 16, 2008, and which further is a continuation-in-part to U.S. patent application Ser. No. 12/024,714, entitled "VERIFYING AND ENCOURAGING ASSET CONSUMPTION IN A COMMUNICATIONS NETWORK," filed on Feb. 1, 2008, which in turn claims priority under 35 U.S.C. §119 to U.S. Provisional Application No. 60/887,750, entitled "COMPENSATING FOR AD-SKIPPING IN A COMMUNICATIONS NETWORK," filed on Feb. 1, 2007. The entire contents of all of the noted patents and applications of which are incorporated by reference herein as if set forth in full.

FIELD OF INVENTION

The present invention relates generally to providing information of interest, such as follow-on advertising information, to users of a communications network and, in particular, to a system for providing information of interest identified in relation to a first communications network (e.g., a broadcast television network or the internet) to a user at a second communications network (e.g., the internet or a broadcast television network).

BACKGROUND OF THE INVENTION

Assets such as advertising materials or items of programming content are provided in connection with various communications networks such as broadcast networks and data networks. In the advertising context, these assets include commercials inserted into commercial breaks of broadcast television or radio, product placement advertising embedded into pre-recorded or live programming, banner ads, pop-up ads and the like. These different types of assets have been used in different contexts and have different relative advantages that have been the subject of considerable attention by asset providers, network providers and other interested parties.

In the case of broadcast television, commercials broadcast during commercial breaks have long been a significant source of revenues. These commercials can be designed to use full motion video and audio content to create viewer impressions that have substantial impact. Moreover, large audiences can be reached with some degree of targeting based on the demographics of the audience of the associated programming. Indeed, television advertising has been integral to the marketing of some of the most valuable brands of our era.

Of course, though, there are limitations to the effectiveness of television advertising. For example, air time for such advertising is expensive, particularly in connection with programming having the largest audiences of the most desirable demographics. In part because of the high value of such advertising spots, advertisers are limited, as a practical matter, to brief time intervals to make the desired impression and convey sufficient information to advance potential sales opportunities. Moreover, because of the passive nature of the broadcast experience, viewers are generally not in a position to immediately consummate a transaction or even, in most cases, to record information for later use. The latter shortcoming has led to the art forms of jingles, mnemonics and the like to assist viewers in retaining important advertising information.

By contrast, advertising in data networks can take advantage of interactive functionality to improve ad effectiveness. For example, users can select links of interest, in some cases, to delve deeper into details of interest and obtain more customized content. However, such data network advertising is not effective in reaching some consumers. In addition, such advertising can be easily avoided or disregarded by some network users. Moreover, metrics for measuring the effectiveness of such advertising are still being developed, particularly in contexts where the ads do not lead to an immediate "click."

Accordingly there is a continuing effort to provide effective asset delivery to users of multiple networks in different use modes. Ideally, asset providers would like to utilize the comparative advantages of each network. It would also be useful to better understand how such assets lead to actual purchase decisions (in the case of commercial assets) so as to "close the loop" concerning analysis of asset effectiveness. In this regard, it would be useful to verify consumption of assets and to collect consumer behavior information for correlation with the verified consumption data to provide a better understanding of asset effectiveness.

Some efforts have been made to provide follow-on information in relation to network ads. For example, systems have been proposed where a specialized remote can attempt to track television ads of interest such that the remote can then be downloaded at a data terminal to access related information via the data network. However, this requires specialized equipment and may be inconvenient if the data terminal and television are not at the same locations. Systems have also been proposed where a specialized remote can bookmark the present date, time, and channel in response to a user input. Using this bookmarked information in combination with stored information relating to the fixed advertisement schedule, the system can provide a list of Internet web addresses that relate to ads of interest. The links can then be viewed either at the television or they may be viewed at a separate computer after the user has downloaded the addresses from the specialized remote to the computer or manually entered the addresses into the Internet browser. However, this requires specialized equipment and, if the viewer does not wish to view the follow-on information at the television itself, requires the viewer to initiate and undertake additional steps to access the follow-on information. In addition, the system does not account for and would not function within a targeted advertising environment in which different ads (by one or multiple asset providers) are delivered during a given ad spot.

In addition, it is believed that systems have been implemented, to some extent, that enable a user of a personal video recorder ("PVR") device to provide an input in relation to specified ads, for which additional information has been stored, and thereby access the stored information. However, this requires use of storage resources at the PVR and has limited functionality in relation to network data transfer.

SUMMARY OF THE INVENTION

The present invention is directed to improving the effectiveness of asset delivery as well as verifying the effectiveness of the assets in leading to desired behaviors. The system incorporates a number of inventive aspects that are applicable in a variety of network contexts. In the context of a cable television network, the invention involves developing a database of pre-recorded or live assets played on the various channels of the cable television network at various times. The system can receive an indication of interest (e.g., associated with an explicit user input such as a remote control input) entered in connection with an asset shown at any time during the viewer experience (e.g., a conventional advertisement during a programming break, a product placement advertisement, a pre-recorded or live television broadcast). The indication of interest can be associated with the time and channel being viewed and, in turn, with the subject matter of the content being viewed at the time of the indication of interest. As discussed below, this information can be used to provide a follow-on asset or follow-on information via a different network or mode, to analyze advertisement effectiveness, to correlate advertisement viewing and consumption to purchasing decisions, and a variety of other purposes.

One implementation provides a request for information ("RFI") method and apparatus ("utility") for monitoring usage of a cable television network for use in delivering assets via a second network, thereby taking full advantage of different usage modes associated with different networks. For example, asset providers, including advertisers and programming providers, may produce assets (e.g., advertisements or pre-recorded or live programming) that include RFI icons indicating that the assets are RFI enabled and that a user may request additional follow-on information relating to any of the RFI enabled assets. In this regard, asset providers may, for example, insert the RFI icons into RFI enabled assets during the post-production activities for pre-recorded assets or during the production of live assets.

The RFI icon may indicate the type of follow-on information that is available for the particular RFI enabled asset (e.g., display a music cleft for information relating to music, a dollar sign for coupons or financial incentives, and so on). Alternatively, the asset may include a general RFI icon, and the user may be prompted at a later time regarding what type of information the user would like to receive in relation to the RFI enabled content. For example, the user may be shown a thumbnail view of the video frame that appeared at the time the RFI request was made before the user is prompted to provide further instructions regarding the specific follow-on information desired.

In addition, the RFI icon may be visible throughout the duration of the RFI enabled asset or it may be visible for only a discrete period of time. For example, an RFI icon may be present throughout the duration of a commercial advertisement. In another implementation, however, the RFI icon may appear at the beginning of a program with instructions for the user to press the appropriate button on the remote control at anytime during the program that the user notes something of interest. For example, an RFI icon containing a musical cleft may appear at the beginning of the television show Lost. If and when the user hears music that is of interest to the user, the user may press the appropriate button on the remote control to receive additional information regarding, for example, the artist(s) and track(s) played and to optionally download the music.

The RFI utility may be an opt-in program on two levels: First, users may opt-in or subscribe by creating an RFI account that includes certain information voluntarily provided by the user. This information may include demographic information such as, for example, age, gender, ethnicity, income level, or geographic location. It may also include contact information, such as, for example, an e-mail address and preference information such as privacy permissions, product preferences, and the programming networks for which the user would like to enable the RFI utility. Second, and as discussed above, a subscribed user may indicate interest in a particular RFI enabled asset on a real-time basis. Specifically, when a broadcast television user views an RFI enabled asset, the user may indicate an interest in receiving follow-on information associated with that asset by clicking a specified button on the user's remote control, or by triggering an RFI input. Depending on the architecture of the broadcast television network and the software resident at the user's set top, the RFI input may indicate a date, time, and channel associated with the user's indication of interest or it may contain an indication regarding the specific asset being viewed at the time of the user's indication of interest.

To encourage users to opt-in and to educate users regarding the RFI program, a network operator, commonly referred to as a Multiple Systems Operator (MSO) such as, for example, Time Warner Cable, Comcast, and Cox Communications, may educate users regarding the RFI utility using broadcast information commercials, mailers, or the like. These informational materials may explain the RFI utility and instruct broadcast network users as to how to subscribe or opt-in to the program, and once subscribed, how to indicate an interest in specific RFI enabled assets such that the user will receive follow-on information. In addition, content providers may also educate users regarding the RFI utility by using network pundits to provide real-time instruction to users as RFI icons become available. For example, during a live CNN newscast, an anchorman could instruct viewers to press select on their remote controls whenever the RFI icon appears at the bottom of the screen to receive more information regarding a particular news story. The pundit could also instruct users to visit the network's internet website at www.cnn.com and follow the appropriate links to subscribe or opt-in to the RFI program. During the subscription or opt-in process, the user may choose to enable the RFI utility for specific additional programming networks or the user may choose to opt-in globally for every available programming network.

To provide additional incentive to users to opt-in to the RFI program, one or more of the benefiting entities, such as, for example, the MSO, the network or an advertiser, may employ a rewards program in which value is credited to subscribing user accounts based on the consumption of assets, indications of interest in follow-on information, and ultimately, purchasing decisions made after assets and/or follow-on information are consumed.

In a traditional advertising paradigm, the RFI utility may be implemented without specialized software resident at the user's set top (e.g., television). Rather than a particularized RFI input, a user's click stream may be transmitted to a head end of the MSO (i.e., a platform for receiving and distributing broadcast content). Because the click stream conveys all of the key selections made using the remote control (channel, volume, power, any specialized keys) as well as the date and time of those selections, the MSO may use the click stream information to determine whether the user clicked or pressed a specific key (e.g., a key the user was instructed to select to receive follow-on information) during the applicable time period and on the particular channel that the RFI icon appeared.

Once the MSO identifies the specific asset of interest to the user, the MSO may consult one or more databases to construct a profile for the user. That is, in the course of administering the RFI utility, the MSO may maintain one or more databases that include subscriber-provided information (e.g., information provided by the user during the process of opting-in to the RFI program) and third-party information (e.g., asset provider mailing lists, data assembled from credit card companies, credit agencies, or credit card transaction processing services). The MSO may also maintain a privacy database to restrict personally identifiable information, or other information, from being released to asset providers (e.g., user-specified privacy permissions, government privacy regulations, MSO implemented privacy policies). Using this subscriber information, the MSO may construct a user profile and pass that profile, along with an identification of the asset of interest, to the asset provider in an RFI request. The RFI request may be stripped of all personally identifiable information, or alternatively, it may include personally identifiable information in accordance with the various privacy regimes included in the privacy database or in accordance with an implicit or explicit privacy policy.

In response, the asset provider may use the profile contained in the RFI request to prepare an augmented package of assets or follow-on information that is appropriately tailored for the particular user and the particular asset of interest. Then the asset provider may return the tailored package of assets or follow-on information to the MSO for delivery to the user via a network or mode that is separate from the broadcast television network. For example, the MSO may provide the follow-on information to the user through a web-portal (e.g., a interactive web-based forum such as iBoard) that is associated with the user's RFI account and that is accessible to the user via various computing devices including, for example, personal computers and handheld, data-enabled devices (e.g., smart phones) or the MSO may e-mail or even mail the follow-on information directly to the user. The web-portal may contain follow-on information related to RFI inputs from the user, and in addition, the web-portal may be configured to receive information from the user and/or third-party databases (e.g., retailers, asset providers, programming providers) relating to the user's consumer behavior. Alternatively, and depending on the mandates of the various privacy regimes included in the MSO's privacy database, the asset provider may provide the follow-on information directly to the user.

For example, in the context of an RFI enabled advertisement, an automobile manufacturer such as General Motors ("GM") may enter into a contract with an MSO such as Comcast to run an RFI enabled truck advertisement, and further, to provide GM with RFI requests that include information relating to the requesting user's annual income and most recent vehicle purchases. As a result, when Comcast receives an RFI input from a user, it associates that RFI input with GM's truck advertisement and forwards an RFI request to GM. The RFI request includes the user's annual household income of $250,000/year and the fact that the user purchased a Cadillac Escalade during the previous year. Though GM does not know the identity of the user or any other personally identifiable information, it may tailor its follow-on information according to the user's high-income level and recent purchase of a luxury SUV from a competing company. In turn, GM provides the tailored follow-on information to Comcast for delivery to the user via, for example, access via a web-portal or an e-mail at the address the user has provided in a user account.

As discussed above, RFI enabled assets need not include only advertisements. Instead, any pre-recorded or live content may be RFI enabled, and in this regard, the RFI utility provides a simple mechanism for providing follow-on information relating to commercial advertisements inserted into commercial breaks of broadcast television programming, product placement advertisements embedded into broadcast television programming, and the content of broadcast television programming itself (e.g., sports, news, music, special promotions).

To close the loop concerning analysis of asset effectiveness, the MSO may maintain an RFI platform or database to receive consumer behavior information. Consumer behavior information may relate to purchasing decisions made by users after viewing an RFI enabled asset, after requesting follow-on information related to an RFI enabled asset, or after consuming a follow-on asset or information. MSOs may acquire consumer behavior information through many channels, including third-party databases maintained by credit card companies, credit agencies, or credit card transaction processing services, through asset providers and/or associated vendors or retailers that are equipped to track purchases through the use of loyalty numbers or member IDs associated with participating users' RFI accounts, through third-party consumer marketing services or affiliate program providers that monitor member purchases made with participating asset providers and/or retailers, or through direct-user reporting of transactions. Using the collected asset consumption information and consumer behavior information, MSOs may perform a variety of statistical analyses to correlate the relationships between asset consumption and consumer purchasing decisions to positively affect the way asset providers design and implement effective marketing programs.

The utility described above provides several benefits to broadcast network users, MSOs, programming networks, and asset providers. First, the utility allows providers to more effectively target assets to users because asset providers may craft follow-on assets and information that are tailored to particular user profiles. Second, because users are able to view broadcast television assets without interruption and consume follow-on assets in an interactive environment at a separate time, asset providers may achieve the benefits of high impact, large reach television advertising as well as the opportunity to engage interested users in an interactive mode with the potential of instantaneous transaction consummation. Third, the utility provides a mechanism for obtaining reliable statistical feedback regarding what users are consuming their assets, and further, what users that are requesting additional information relating to their assets and ultimately purchasing related products and/or services.

A targeted asset delivery environment serves to further enhance the RFI utility discussed above. A targeted asset delivery system allows for delivery of targeted assets to desired groups of individuals or individuals having desired characteristics or audience classification parameters including personal information, demographic information, geographic information, psychographic information, or any other information that may be relevant to an asset provider in identifying a target audience. First, targeted asset delivery systems generally employ software resident at the user equipment device/digital set top box or another network location such as the head end that is aware of the targeted assets selected for or delivered to the set top. Thus, any express RFI input from a user may directly specify the asset to which the RFI input relates, and therefore, the MSO need not manipulate the click-stream data to associate a particular click with an RFI input. Second, while a user's indication of interest may be express (e.g., an RFI input), as discussed above, a targeted asset delivery system accommodates targeting of assets in a broadcast network with a high degree of granularity based on different audience classifications. As a result, the mere fact that an asset is selected for a particular user may be considered an implied indication of interest in the products, services, or asset provider associated with the selected asset. Thus, follow-on information may be directed to the user based only on the delivery, or delivery and consumption, of a targeted asset. Third, because many households include multiple users, targeting based on household demographics alone may have limited effectiveness. In this regard, targeted asset delivery systems include mechanisms to distinguish between multiple users of a single set top box such that any RFI request issued by an MSO to an asset provider may stipulate which of multiple users associated with the set top box has indicated interested in a particular asset, and in turn, any follow-on information may be crafted for that particular user.

In accordance with one aspect of the present invention, a utility is provided for allowing a user of a broadcast network to receive additional information regarding broadcast content of interest. Conventionally, broadcast networks have been viewed as push networks without any opportunity for users to interactively request or otherwise receive information regarding broadcast content of interest. In accordance with the present invention, the noted utility involves receiving, from a user equipment device of the broadcast network, request information regarding an indication of interest specific to the broadcast network user. The indication is associated with delivery of first broadcast content to the network user via the user equipment device. For example, the indication of interest may be based on an affirmative user input, such as by way of a television remote, or may be provided from a targeted asset system that has selected a targeted asset for delivery to the network user based on classification parameters for the user and an assessment by the system that the asset was consumed by the user.

The utility further involves using a data structure for making an association of the request information to a first information provider and providing information of the first information provider from a remote location to the broadcast network user. In this regard, the data structure may be a database associated with a network platform. The database may include information for relating the user input to a specific asset. For example, in the case of a broadcast television network, the database may include information regarding what assets were broadcast on what channels at what times. This information can be used in conjunction with information regarding the time of the user input and the current channel setting of the user equipment device to associate the input with a particular asset. Information regarding the identified asset may be transmitted to the asset provider or another operating on behalf of the asset provider so that the asset provider can provide additional information to the network user. The additional information, e.g., an asset, may be provided by the broadcast network, via a separate network, e.g., the internet, or via another modality such as contact by phone or mail. In the case of providing a follow-on asset via the broadcast network, the follow-on asset may be immediately played or stored at the user equipment device. Alternatively, a URL may be e-mailed to a data terminal of the user. In a subsequent data network session, the user can then use the URL to interactively obtain further information. In this manner, benefits associated with the broadcast network asset and the data network assets are realized.

In accordance with another aspect of the present invention, a utility is provided for delivering a follow-on asset to a particular user of a multi-user device. Some user equipment devices including, for example, a television and any associated set top box, may be used by different users or combinations of users at different times. It will be appreciated that this could interfere with the ability to deliver follow-on assets to the appropriate user. In this regard, a utility in accordance with the present invention, involves monitoring the usage of a first user equipment device that is associated with multiple users to identify a first network user, from among the multiple users, associated with a particular usage of the device. Based on this monitored usage, an asset is delivered to the first user via a second network different than the first network. For example, a user of a television network may provide an input in relation to a commercial indicating an interest in receiving more information regarding an advertised product. In accordance with the present invention, a classifier associated with a set top box can identify the current user identification together with a request for information. This request for information can be used to provide additional information regarding the product of interest to the user via a second network such as the internet.

In accordance with a still further aspect of the present invention, a request for information system is provided in conjunction with a targeted advertising system of a broadcast network. A targeted asset system may provide a variety of information that is useful in providing follow-on information. For example, a targeted asset system may identify a current user(s) of a user equipment device and may further estimate classification parameters of the user(s) such as demographic information or interests. In this regard, selection of an asset by a targeted asset system may be tantamount to obtaining an indication of interest for the user (though suitability of an asset in a targeted asset system may be determined from the perspective of an asset provider, which may or may not correspond to actual interest by the user).

The associated utility involves providing a targeted asset system in connection with the broadcast network where assets are targeted to users of the broadcast network by matching targeting parameters of an asset to classification parameters of a user. Request information is then received from the user equipment device regarding an indication of interest specific to the broadcast network user. The indication is associated with delivery of a targeted asset to the network user via the network equipment device. Again, the indication may be based on an affirmative input by the user or may be related to a selection of the targeted asset by the targeted asset system. Based on the request information, a second asset is delivered to the network user via a second network different than the first broadcast network. For example, the second asset may be an advertisement delivered via the internet or a URL e-mailed to the user.

In accordance with another aspect of the present invention, information obtained from monitoring usage of a first network is used to deliver assets via a second network. For example, information obtained based on monitoring usage of a television network may be used to target advertisements via the internet or vice versa. The associated utility involves monitoring a usage of a first communications network by a user to obtain an indication of interest with respect to content delivered via the first network. Based on the monitored usage, an asset is delivered to a second user, the same or different than the first user, via a second communications network different than the first communications network. The asset has a subject matter associated with the content delivered via the first communications network. Thus, for example, a television viewer may provide an input in connection with a commercial of interest. Based on that input, the commercial or information related to the commercial of interest may be delivered to the user or to other users (e.g., on a friends or family list) via a second network such as by e-mails transmitted across the internet.

In yet another aspect of the present invention, signals regarding a consumption status of a targeted asset are received from a user equipment device of a network user. The signals verify whether the user consumed all or a portion of the targeted asset. To encourage the user to consume assets, a rewards account is established for the user, and the user is credited value based on the user's verified consumption of assets or the user's indication of interest in a particular asset. The value credited to the user may include service credits, service upgrades, monetary rewards, product discounts, product credits, and the like. In addition, the utility provides for the collection of consumer behavior information associated with the user. Consumer behavior information may include, for example, purchasing decisions made by the user after the user has consumed assets. Once consumption verification and consumer behavior information is collected, the verified asset consumption information and the collected consumer behavior information are correlated.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

Figure 1:
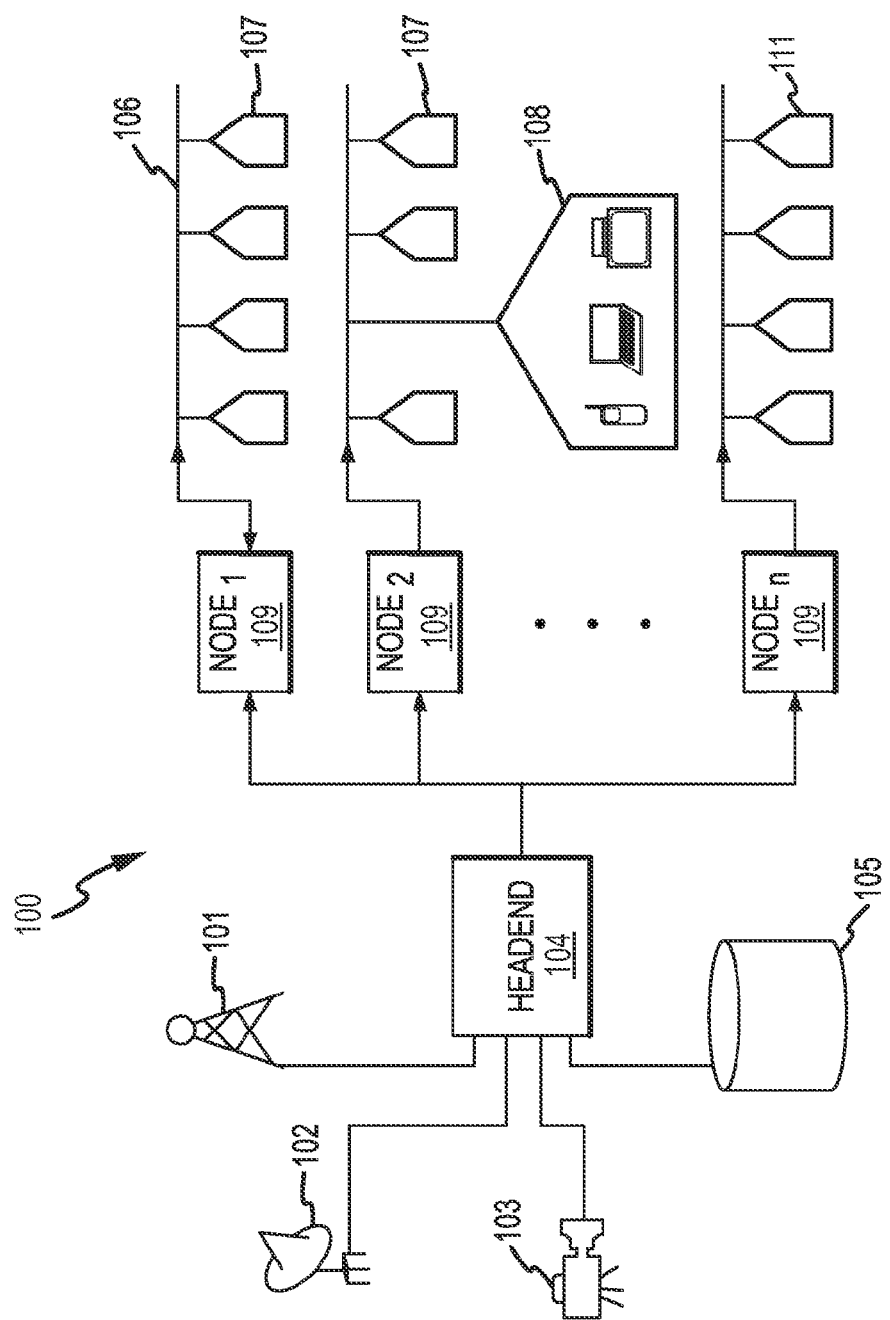
FIG. 1 illustrates a cable television network in which the present invention may be implemented.

The present invention relates to various structure and functionality for delivery of assets in communications systems, as well as a system for encouraging asset consumption, verifying asset consumption, and linking subsequent consumer behavior to such assets and associated business methods. In implementations described below, the invention relates to monitoring usage of one communications network and using resulting information to deliver an asset to the user or another user(s) via another communications network. In one particular implementation, a user receives a first asset, such as a commercial airing during a programming break or another advertisement, via a broadcast television network such as a cable television network. Based on an indication of interest, e.g., an affirmative indication via a user input or an inference drawn from selection of the asset by a targeted advertising system, additional information is provided to the user via e-mail, internet advertising, phone, mail or another mode. This allows advertisers or other asset providers to realize the benefits of broadcast television as well as the benefits of other modalities such as interactive information delivery via a data network. While delivering additional information in an interactive data network such as the internet is a particularly advantageous implementation, it will be appreciated that various aspects of the invention are applicable in other contexts.

The following description is divided into a number of sections. The Introduction section describes the broadcast network and network programming environments. The next section provides an overview of the targeted asset delivery environment, including a discussion of viewer presence and classification technologies as well as related targeted asset delivery technologies. The succeeding section provides an overview and exemplary implementations of a request for information (RFI) system in accordance with the present invention and highlights advantages of certain preferred implementations thereof. The described RFI system includes several components beyond the provision of follow-on assets or information to interested users in a separate network, including encouraging and verifying asset consumption, acquiring consumer behavior information, and correlating verified asset consumption information and consumer behavior information to close the loop with regard to an analysis of asset effectiveness. While applicable in other network environments, these discussions make specific reference to a cable television related implementation.

I. Introduction

A. Broadcast Networks

One application of the present invention is in the context of networks used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. Examples of broadcast networks used to deliver content to specific users on a pulled basis include broadcast networks used to deliver on demand content such as VOD and podcasts. Examples of broadcast networks include cable television networks, satellite television networks, and satellite radio networks. In addition, audio, video or other content may be broadcast across Internet protocol and telephony networks. In any such networks, it is common practice to insert or otherwise provide informational content or "assets" such as advertisements (e.g., commercials air during programming breaks or product placement or other content embedded in or superimposed on programming) into a broadcast stream. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users. Among other things, the headend 104 may be operative to amplify, convert and otherwise process the broadcast content signals as well as to combine the signals into a common cable for transmission to network users 107 or the headend 104 may be operative to process the signals to provide individual content for specific households (e.g., household 111). The headend also processes signals from users in a variety of contexts as described below. The headend 104 may thus be thought of as the control center or local control center of the cable television network 100.

Typically, there is not a direct fiber link from the headend 104 to a user equipment device such as a customer premises equipment (CPE) device 108. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. In some cases, the nodes 109 may process content received from the headend 104 to generate individualized content for a specific household. The resulting content within a node area is typically distributed by optical and/or coaxial links 106 to the premises of particular users 107. Finally, the content is processed by the CPE 108, which may include a television, data terminal, a digital set top box, a DVR, or other terminal equipment. It will be appreciated that digital or analog signals may be involved in this regard.

II. Asset Delivery Environment

A. Broadcast Network Assets

Broadcast networks, such as described in FIG. 1, may include asset-supported and premium content channels/networks. Such programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time slot buys. Specifically, asset providers generally identify a particular program or time-slot on a particular network where they desire their assets to be aired. The cost for the airing of the asset depends on a number of factors, but primary factors are the size of the audience for the programming in connection with which the asset is aired and the demographic composition of the audience. Thus, the standard pricing model is based on the cost per thousand viewers (CPM), where the desired demographics of those viewers may be specified. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. More specifically, ratings may be generated for each network for each quarter hour segment. The presumption is then made that users for a program (corresponding to a quarter hour segment of a network) also consume the assets for that program. Thus, the historical performance of the particular program, for example, as estimated by the Nielsen system, may be used to set asset delivery prices for future time slots or "breaks" associated with that program.

Generally, a break may include a series of asset delivery spots and the content of a break may be determined by a number of entities. For example, some asset delivery is distributed on a basis coextensive with network programming, e.g., on a national basis. This asset delivery is conventionally scheduled based on a timed play list. That is, the insertion of content is centrally controlled to insert assets at defined times. Accordingly, the programming and national asset delivery may be provided by the programming networks as a continuous content stream without cues for asset insertion. For example, prime-time programming on the major networks is often principally provided in this fashion.

In other cases, individual spots within a break are allocated for Regional Operations Center (ROC), affiliate, super headend or local (headend, zone) content. In these cases, a cue tone or message identifies the start of the asset delivery spot or spots (a series of assets in a break may all trigger from one cue). The cue generally occurs a few seconds before the start of the asset delivery insertion opportunity and may occur, for example, during programming or during the break (e.g., during a national ad). The RFI system of the present invention, as will be more fully discussed herein, can coordinate with equipment at any or all levels of this hierarchy to allow for tracking with respect to national, regional and local entities.

Network operators or local network affiliates can generally schedule the non-national assets to be included within defined breaks or spots for each ad-supported channel. Conventionally, this scheduling is finalized ahead of time, typically on a daily or longer basis. The scheduled assets for a given break are then normally inserted at the headend in response to the cue tone or message in the programming stream. Typically, all assets within a break trigger from a single cue tone or message. Thus, for example, where a given break includes three spots, the scheduled asset for the first spot is inserted at a first time period after the cue, the scheduled asset for the second spot is inserted at a second time period after the cue, and the scheduled asset for the third spot is inserted at a third time period after the cue. Accordingly, prior to broadcast, the identities of the providers of the assets (e.g., national, regional and/or local) that will be provided with programming are known. Therefore, if a user provides an input with respect to an ad spot in the programming, it may be determined which entity's ad was played, based on the time of the spot relative to the programming and/or by identifying metadata associated with the asset, as will be more fully discussed herein.

As noted, network users employ the network, and content providers and network operators derive revenue, based on delivery of desirable content or programming. The stakeholders in this regard include programming providers, asset providers such as advertisers (who may be the same as or different than the programming providers), network operators such as Multiple Systems Operators (MSOs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers.

Asset providers include a wide variety of manufacturers, retailers, service providers and public interest groups interested in, and generally willing to pay for, the opportunity to deliver messages to users on a local, regional, national or international level. Such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. Network operators (e.g., MSOs) are generally responsible for delivering content to users and otherwise operating the networks as well as for contracting with the networks and asset providers and for billing. Users are the end consumers of the content. Users may employ a variety of types of CPEs or other user equipment devices including television set top boxes, iPOD™ devices, data terminals, wireless devices, satellite delivered video or audio to an automobile and/or appliances with built-in televisions, etc.

As will be discussed in more detail below, one implementation of the present invention involves providing a platform for receiving signals from user equipment devices associated with a cable television network. Based on these signals, the platform identifies an asset of the cable television network that was of interest to a particular user. The platform can then make associated information available to that user (or, optionally, one or more other identified users, e.g., on a "friends" list) via another network. For example, an e-mail may be sent to a stored e-mail address of the user. That e-mail may include additional information about a product of the identified asset of interest and/or a link to a web page having such information.

From the discussion above, it will be appreciated that the signals may be received from a variety of different types of user equipment devices. In this regard, the signals may be based on user inputs such as by entering a designated key of a remote control, phone, PDA, etc. Alternatively or additionally, as will be understood from the description below, the indication of interest may be obtained at least in part from a targeted asset system. Such a system may be operative to identify a user or users currently present at the user equipment device. Such information may be used in conjunction with a user input as noted above to associate the indication of interest with a particular user or users so that a follow-on asset can be appropriately delivered. Of course, the user or users could provide an input identifying themselves but this would render the system more intrusive and might interfere to some extent with the objective of allowing television viewers to retain a substantially passive viewing experience. Moreover, because certain targeted asset systems can identify classification parameters of viewers with a high degree of accuracy and granularity, selection of an asset by such a system may be tantamount to a positive indication of interest (though such selection may be based on desires of an asset provider and not necessarily correspond to desires of a user). Accordingly, the signal transmitted to the platform may be based on a selection by a targeted advertising system rather than a user input. For example, users may opt-in to the targeted asset system in general and may further select a setting that allows asset selections (or certain asset selections) to be used in providing follow-on information or contacts.

In addition, it will be appreciated that the platform may utilize inputs from a variety of sources to properly associate the indication of interest with an asset. As noted above, some commercial spots may be national while others are local. Moreover, channel selections and content may be configured locally by node equipment, DSLAMs and other network platforms. In addition, a targeted asset system may utilize dedicated asset delivery channels or retrieve assets from user equipment device storage. Also assets may be embedded in or superimposed on programming as noted above. Accordingly, a database may be compiled using information from content providers, programming networks, network providers, network equipment, targeted asset systems and the like to identify assets on different channels/bandwidth segments at different times. Alternatively, indications of interest may include asset identifiers.

From the foregoing, it will be appreciated that a targeted asset system may interact with an RFI platform in a variety of ways. An exemplary targeted advertising system is described below. Such a system is described more detail in published U.S. patent application Ser. No. 11/331,835, entitled "Content Selection Based on Signaling from Customer Premises Equipment in a Broadcast Network," and filed on Jan. 12, 2006, which is incorporated herein by reference.

B. The Targeted Asset Delivery Environment

Although the RFI subject matter of the present invention can be used in a variety of both traditional and targeted asset delivery systems, a particularly advantageous targeted asset delivery system is described below. The inventive system, in the embodiments described below, allows for delivery of targeted assets such as advertising so as to address certain shortcomings or inefficiencies of conventional broadcast networks. Generally, such targeting entails delivering assets to desired groups of individuals or individuals having desired characteristics. These characteristics or audience classification parameters may be defined based on personal information, demographic information, psychographic information, geographic information, or any other information that may be relevant to an asset provider in identifying a target audience. Preferably, such targeting is program independent in recognition that programming is a highly imperfect mechanism for targeting of assets. For example, even if user analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities including very fine granularities. For example, it may be desired to target a group, such as based on a geographical grouping, a household characterization or even an individual user characterization. The present invention accommodates program independent targeting, targeting with a high degree of granularity and targeting based on a variety of different audience classifications.

Figure 2:
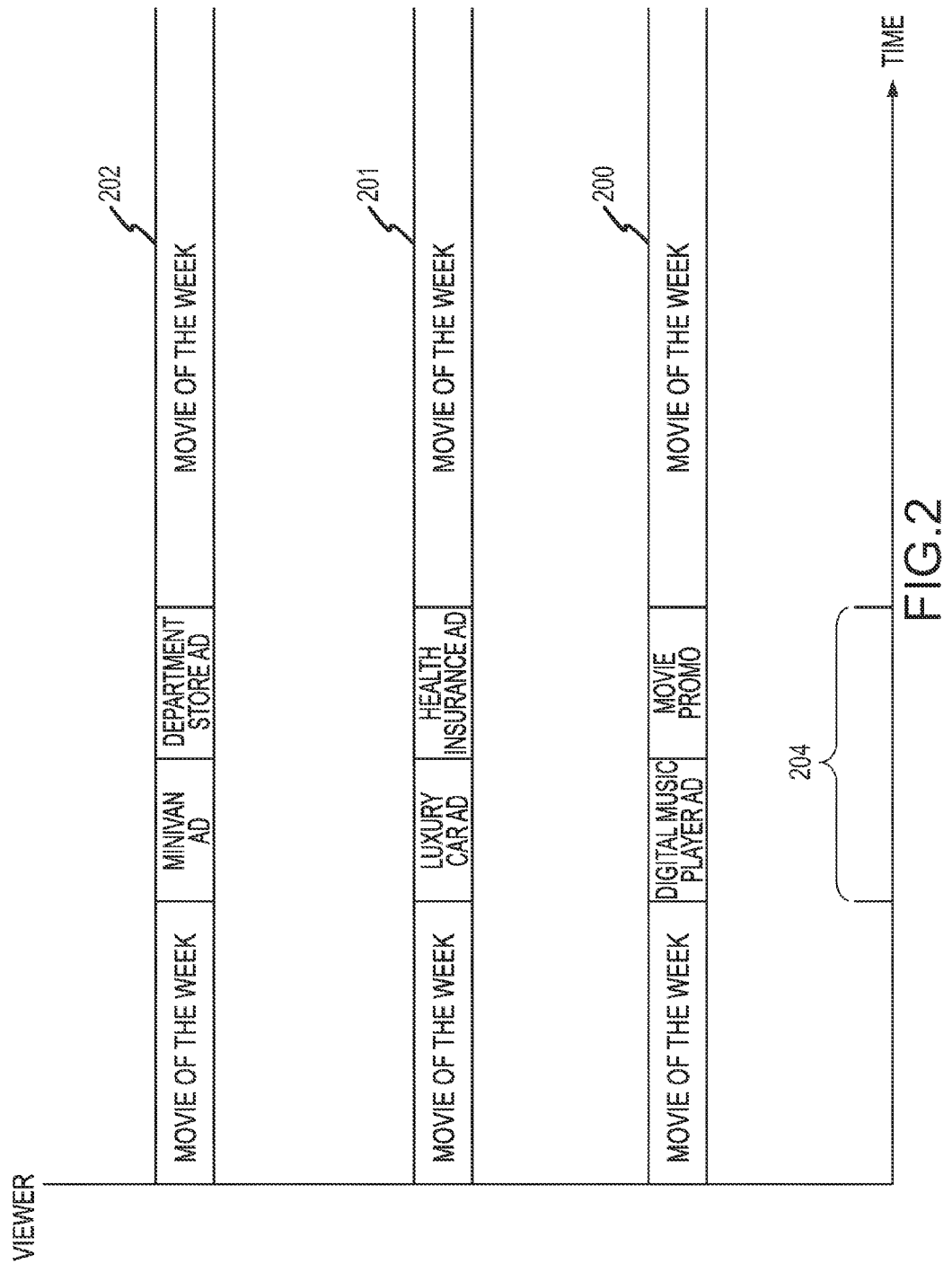
FIG. 2 illustrates a first targeted advertising context of the present invention.
Figure 3:
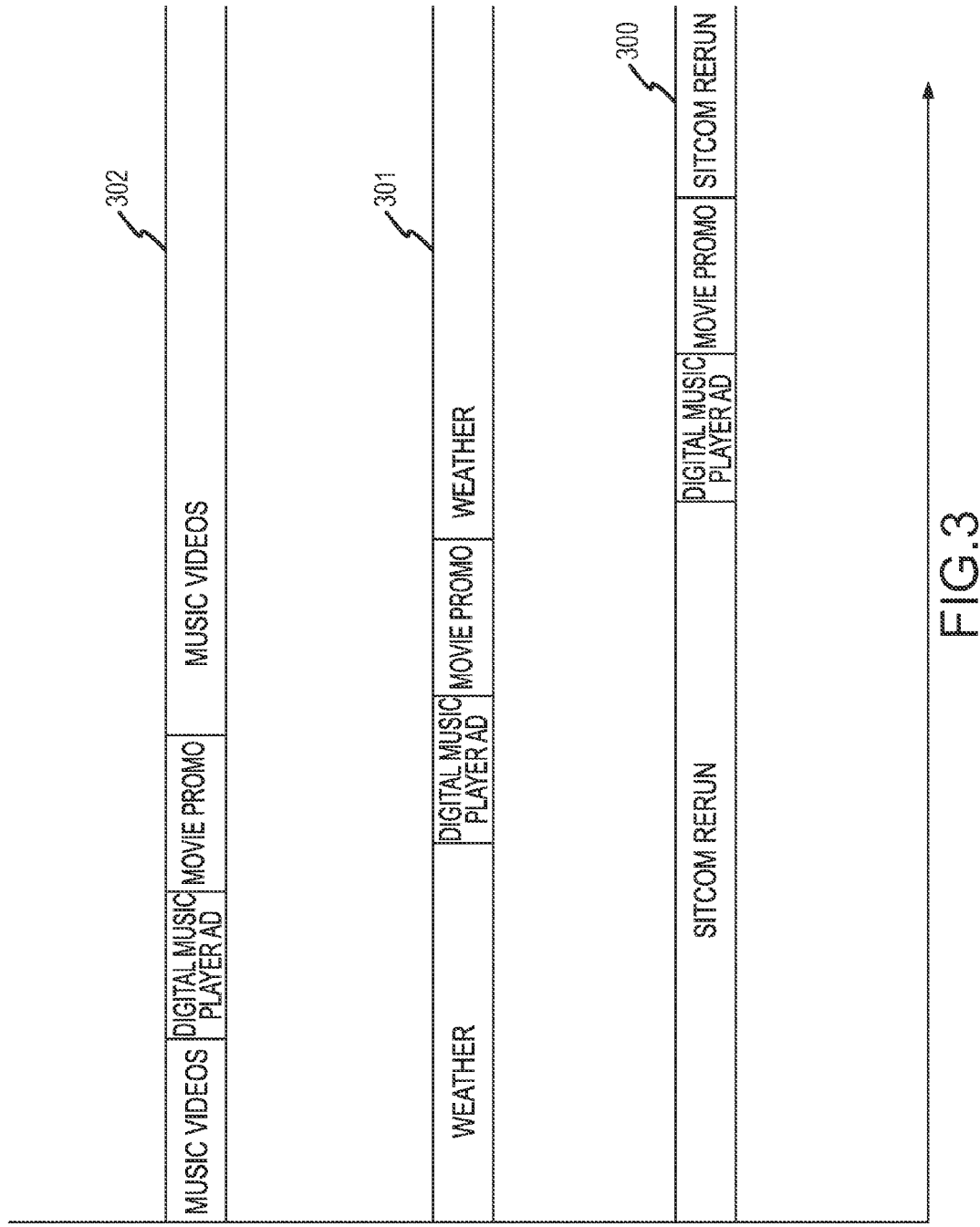
FIG. 3 illustrates another targeted advertising context of the present invention.

FIGS. 2 and 3 illustrate two different contexts of targeted asset delivery supported in accordance with the present invention. Specifically, FIG. 2 illustrates the delivery of different assets, in this case ads, to different users watching the same programming channel, which may be referred to as spot optimization. As shown, three different users 200-202 are depicted as watching the same programming, in this case, denoted "Movie of the Week." At a given break 204 the users 200-202 each receive a different asset package. Specifically, user 200 receives a digital music player ad and a movie promo, user 201 receives a luxury car ad and a health insurance ad, and user 202 receives a minivan ad and a department store ad. Alternately, a single asset provider (e.g., a motor vehicle company) may purchase a spot and then provide different asset options for the spot (e.g., sports car, minivans, pickup trucks, etc.). Similarly, separate advertisers may collectively purchase a spot and then provide ads for their respective products (e.g., where the target audiences of the advertisers are complementary). It will be appreciated that these different asset packages may be targeted to different audience demographics. In this manner, assets are better tailored to particular viewers of a given program who may fall into different demographic groups. Thus, spot optimization refers to the delivery of different assets (by one or multiple asset providers) in a given spot.

Figure 4:
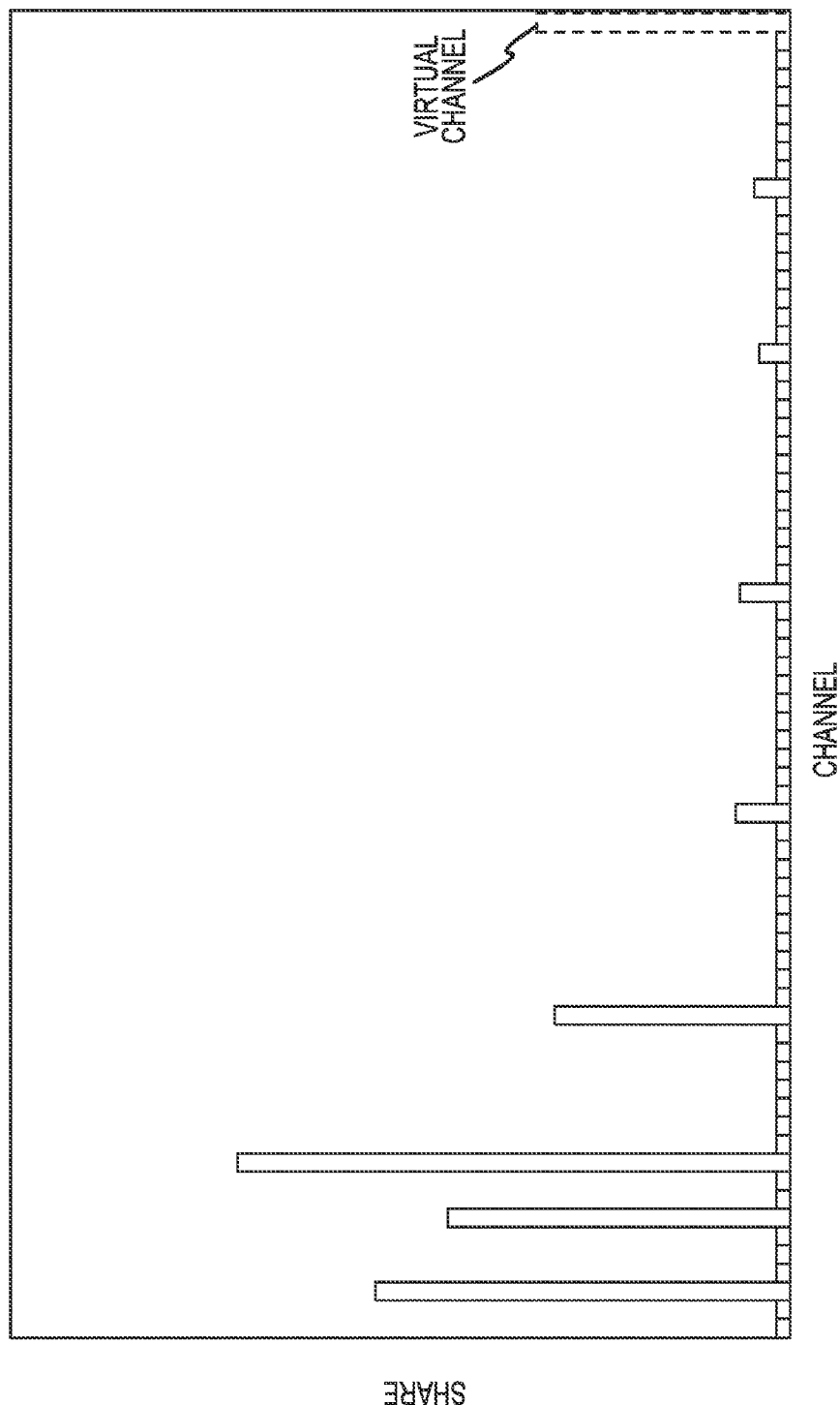
FIG. 4 illustrates an objective of audience aggregation in the context of FIG. 3.

FIG. 3 illustrates a different context of the present invention, which may be termed audience aggregation. In this case, three different users 300-302 viewing different programs associated with different channels may receive the same asset or asset package. In this case, each of the users 300-302 receives a package including a digital music player ad and a movie promo in connection with breaks associated with their respective channels. Though the users 300-302 are shown as receiving the same asset package for purposes of illustration, it is likely that different users will receive different combinations of assets due to differences in classification parameters. In this manner, users over multiple channels (some or all users of each channel) can be aggregated (relative to a given asset and time window) to define a virtual channel having significant user numbers matching a targeted audience classification. Among other things, such audience aggregation allows for the possibility of aggregating users over a number of low share channels to define a significant asset delivery opportunity, perhaps on the order of that associated with one of the high share networks. This can be accomplished, in accordance with the present invention, using equipment already at a user's premises (i.e., an existing CPE). Such a virtual channel is graphically illustrated in FIG. 4, though this illustration is not based on actual numbers. Thus, audience aggregation refers to the delivery of the same asset in different spots to define an aggregated audience. These different spots may occur within a time window corresponding to overlapping (conflicting) programs on different channels. In this manner, it is likely that these spots, even if at different times within the window, will not be received by the same users.

Figure 5:
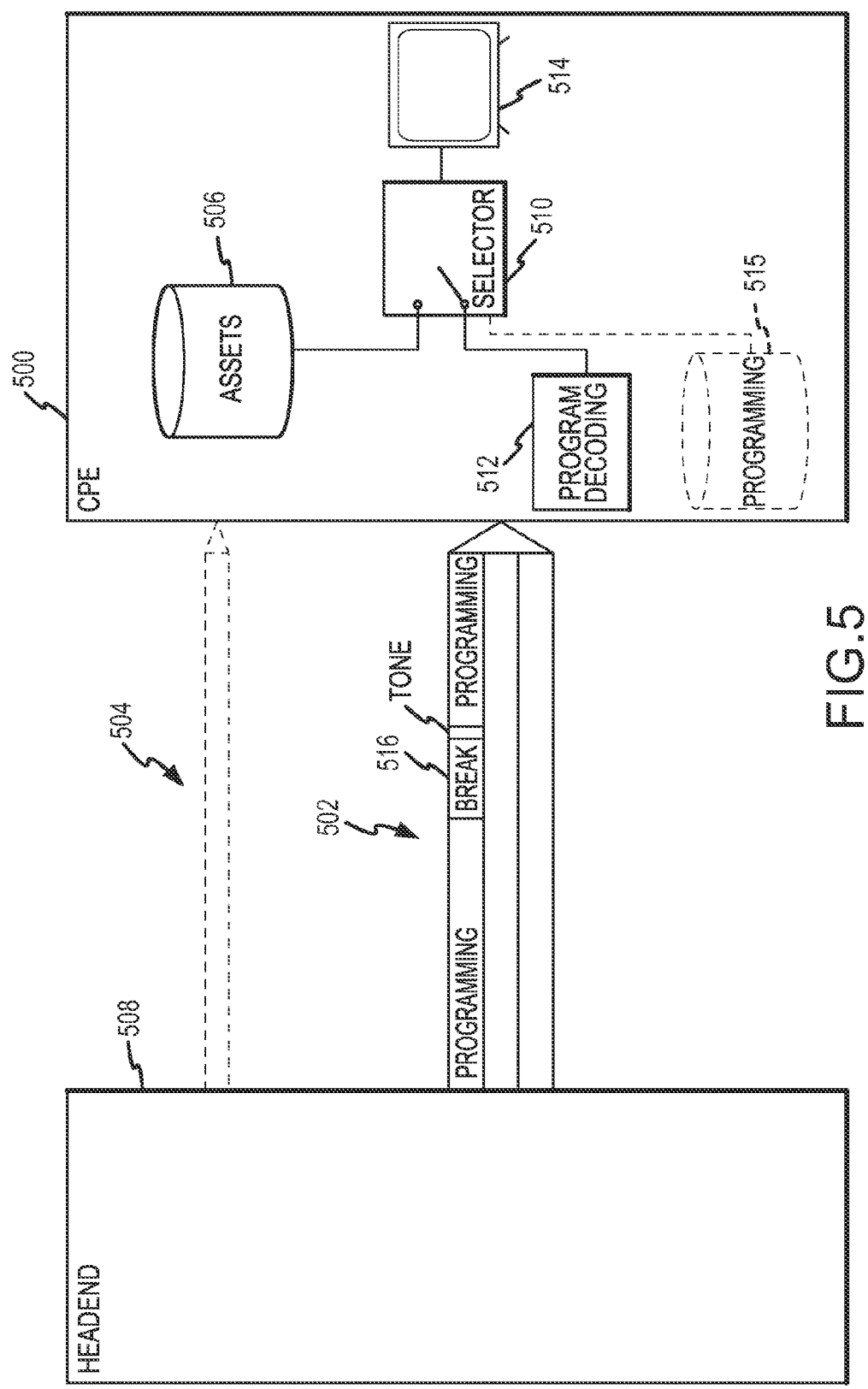
FIG. 5 illustrates an asset delivery system in accordance with one implementation of the present invention.

Such targeting including both spot optimization and audience aggregation can be implemented using a variety of architectures in accordance with the present invention. Thus, for example, as illustrated in FIG. 5, targeted asset insertion can be implemented at the CPEs. This may involve a forward-and-store functionality. As illustrated in FIG. 5, the CPE 500 receives a programming stream 502 and an asset delivery stream 504 from the headend 508. These streams 502 and 504 may be provided via a common signal link such as a coaxial cable or via separate communications links. For example, the asset delivery stream 504 may be transmitted to the CPE 500 via a designated segment, e.g., a dedicated frequency range, of the available bandwidth or via a programming channel that is opportunistically available for asset delivery, e.g., when it is otherwise off air. The asset delivery stream 504 may be provided on a continuous or intermittent basis and may be provided concurrently with the programming stream 502. In the illustrated example, a program-decoding unit, such as a digital set top box, processes the programming stream 502, and programming is displayed on television set 514. Alternatively, the programming stream 502 may be stored in programming storage 515 for CPE insertion.

In the illustrated implementation, the asset, together with metadata identifying, for example, any audience classification parameters of the targeted audience, is stored in a designated storage space 506 of the CPE 500. It will be appreciated that substantial storage at the CPE 500 may be required in this regard. For example, such storage may be available in connection with certain digital video recorder (DVR) units. A selector 510 is implemented as a processor running logic on the CPE 500. The selector 510 functions analogously to the headend selector described above to identify breaks 516 and insert appropriate assets. In this case, the assets may be selected based on classification parameters of the household or, more preferably, a user within the household. Such information may be stored at the CPE 500 or may be determined based on an analysis of viewing habits such as a click stream from a remote control as will be described in more detail below. Certain aspects of the present invention can be implemented in such a CPE insertion environment.

Figure 6:
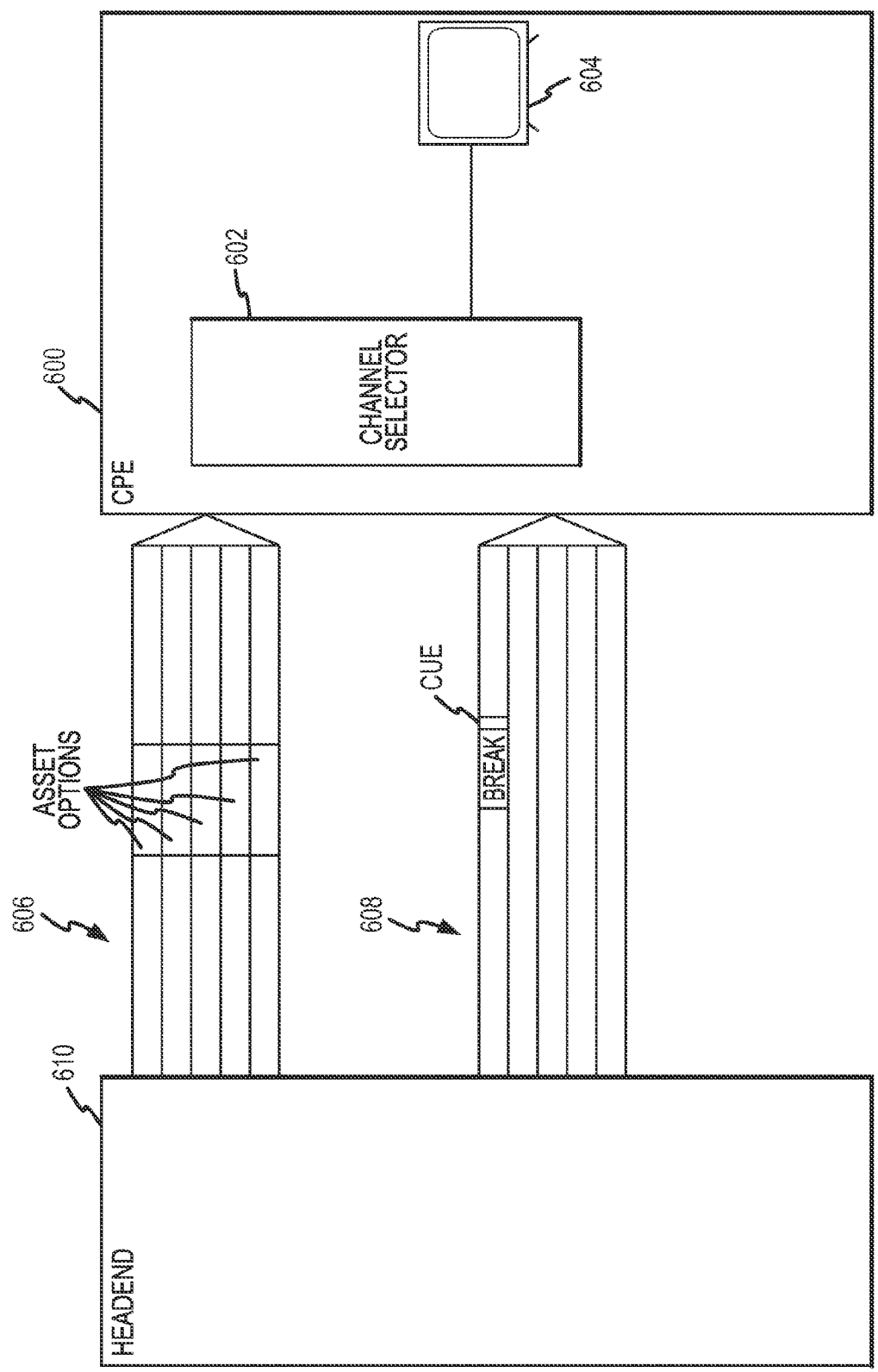
FIG. 6 illustrates an asset delivery system in accordance with a further implementation of the present invention.

In FIG. 6, a different architecture is employed. Specifically, in FIG. 6, asset options transmitted from headend 610 synchronously with a given break on a given channel for which targeted asset options are supported. The CPE 600 includes a channel selector 602, which is operative to switch to an asset channel associated with a desired asset at the beginning of a break and to return to the programming channel at the end of the break. The channel selector 602 may hop between channels (between asset channels or between an asset channel and the programming channel) during a break to select the most appropriate assets. In this regard, logic resident on the CPE 600 controls such hopping to avoid switching to a channel where an asset is already in progress. As described below, this logic can be readily implemented, as the schedule of assets on each asset channel is known. Preferably, all of this is implemented invisibly from the perspective of the user of set 604. The different options may be provided, at least in part, in connection with asset channels 606 or other bandwidth segments (separate from programming channels 608) dedicated for use in providing such options. In addition, certain asset options may be inserted into the current programming channel 608. Associated functionality is described in detail below. The architecture of FIG. 6 has the advantage of not requiring substantial storage resources at the CPE 600 such that it can be immediately implemented on a wide scale basis using equipment that is already in the field.

As a further alternative, the determination of which asset to show may be made at the headend. For example, an asset may be selected based on voting as described below, and inserted at the headend into the programming channel without options on other asset channels. This would achieve a degree of targeting but without spot optimization opportunities as described above. Still further, options may be provided on other asset channels, but the selection as between those channels may be determined by the headend. For example, information about a household or user (e.g., brand of car owned, magazines subscribed to, etc.) stored on the headend may be used to match an asset to a household or user. That information, which may be termed "marketing labels," may be used by the headend to control which asset is selected by the CPE. For example, the CPE may be instructed that it is associated with an "ACME preferred" customer. When an asset is disseminated with ACME preferred metadata, the CPE may be caused to select that asset, thereby overriding (or significantly factoring with) any other audience classification considerations. However, it will be appreciated that such operation may entail certain concerns relating to sensitive information or may compromise audience classification based targeting in other respects.

Figure 7:
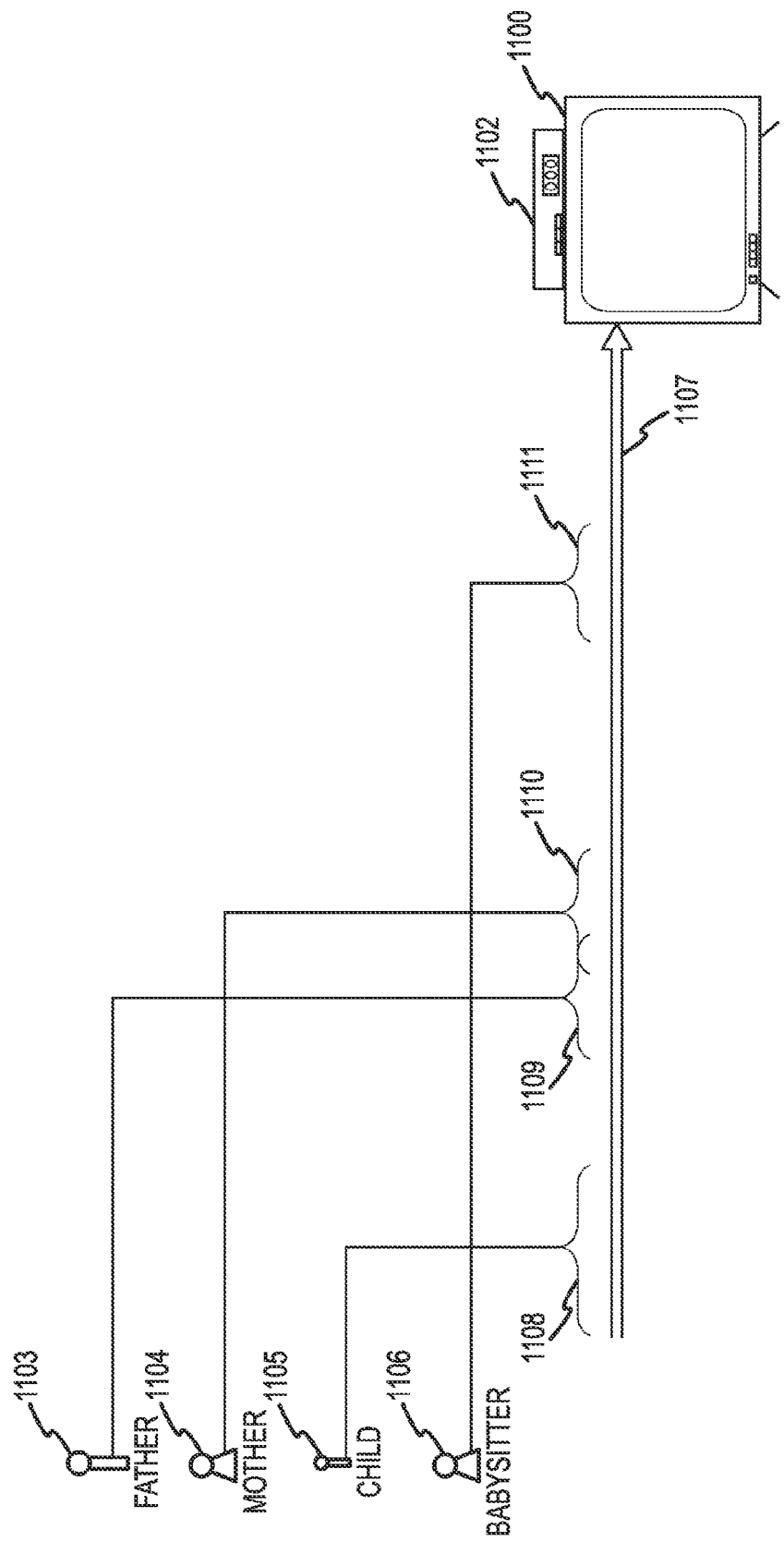
FIG. 7 illustrates the problem of multiple viewers in relation to the present invention.

Much of the discussion above has referenced audience classification parameters as relating to individuals as opposed to households. FIG. 7 illustrates a theoretical example of a CPE including a television set 1100 and a digital set top box 1102 that are associated with multiple users 1103-1106. Arrow 1107 represents a user input stream, such as a click stream from a remote control, over time. A first user 1105, in this case a child, uses the television 1100 during a first time period—for example, in the morning. Second and third users 1103 and 1104 (designated "father" and "mother") use the television during time periods 1109 and 1110, which may be, for example, in the afternoon or evening. A babysitter 1106 uses the television during a nighttime period in this example.

This illustrates a number of challenges related to targeted asset delivery. First, because there are multiple users 1103-1106, targeting based on household demographics would have limited effectiveness. For example, it may be assumed that the child 1105 and father 1103 in many cases would not be targeted by the same asset providers. Moreover, in some cases, multiple users may watch the same television at the same time as indicated by the overlap of time periods 1109-1110. In addition, in some cases such as illustrated by the babysitter 1106 an unexpected user (from the perspective of the targeted asset system) may use the television 1100.

These noted difficulties are associated with a number of objectives that are preferably addressed by the targeted asset system. First, the system should preferably be operative to distinguish between multiple users of a single set and, in the context of the system described above, vote and report to the network accordingly. Second, the system should preferably react over time to changing conditions such as the transitions from use by father 1103 to use by both father and mother 1103 and 1104 to use by only mother 1104. The system should also preferably have some ability to characterize unexpected users such as the babysitter 1106. In that case, the system may have no other information to go on other than the click stream 1107. The system may also identify time periods where, apparently, no user is present, though the set 1100 may still be on. Preferably, the system also operates free from persistent storage of any user profile or sensitive information so that no third party has a meaningful opportunity to misappropriate such information or discover the private network usage patterns of any of the users 1103-1106 via the targeted asset system. Privacy concerns can alternatively be addressed by obtaining consent from users. In this matter, sensitive information including personally identifiable information, or PII, can be transmitted across the network and persistently stored for use in targeting. This may allow for compiling a detailed user profile, e.g., at the headend. Assets can then be selected based on the user profile and, in certain implementations, addressed to specific CPEs.

In certain implementations, the present invention monitors the click stream over a time window and applies a mathematical model to match a pattern defined by the click stream to predefined audience classification parameters that may relate to demographic or psychographic categories. It will be appreciated that the click stream will indicate programs selected by users, volume and other information that may have some correlation, at least in a statistical sense, to the classification parameters. In addition, factors such as the frequency of channel changes and the length of time that the user lingers on a particular asset may be relevant to determining a value of an audience classification parameter. The system can also identify instances where there is apparently no user present.

In a first implementation, as is described in U.S. patent application Ser. No. 11/743,544, entitled "Fuzzy Logic Based Viewer Identification for Targeted Asset Delivery System," filed May 2, 2007, which is incorporated herein by reference, logic associated with the CPE 1101 uses probabilistic modeling, fuzzy logic and/or machine learning to progressively estimate the audience classification parameter values of a current user or users based on the click stream 1107. This process may optionally be supplemental based on stored information (preferably free of sensitive information) concerning the household that may, for example, affect probabilities associated with particular inputs. In this manner, each user input event (which involves one or more items of change of status and/or duration information) can be used to update a current estimate of the audience classification parameters based on associated probability values. The fuzzy logic may involve fuzzy data sets and probabilistic algorithms that accommodate estimations based on inputs of varying and limited predictive value.

In a second implementation, as is described in U.S. patent application Ser. No. 11/994,078, entitled "Method and Apparatus to Perform Real-Time Audience Estimation and Commercial Selection Suitable for Targeted Advertising," filed Nov. 21, 2007, which is incorporated herein by reference, the audience is modeled as an incomplete or noisy signal that can be processed to obtain audience classification parameter information. More specifically, a series of clicks over time or associated information provides observations reflecting the audience. The audience is the desired signal. However, the signal is assumed to be incomplete or noisy—a common problem in signal processing. Accordingly, filtering techniques are employed to estimate the "true" signal from the input stream and associated algorithms correlate that signal to the desired audience classification information. For example, a nonlinear adaptive filter may be used in this regard.

The targeted advertising system provides a variety of information that can be used in directing follow-on information to network users. This includes information identifying the user as well as classification parameter information. Systems for using such information to deliver follow-on information will now be described.

III. RFI System Overview and Exemplary Applications

A. Follow-on Information Request and Delivery

Figure 8:
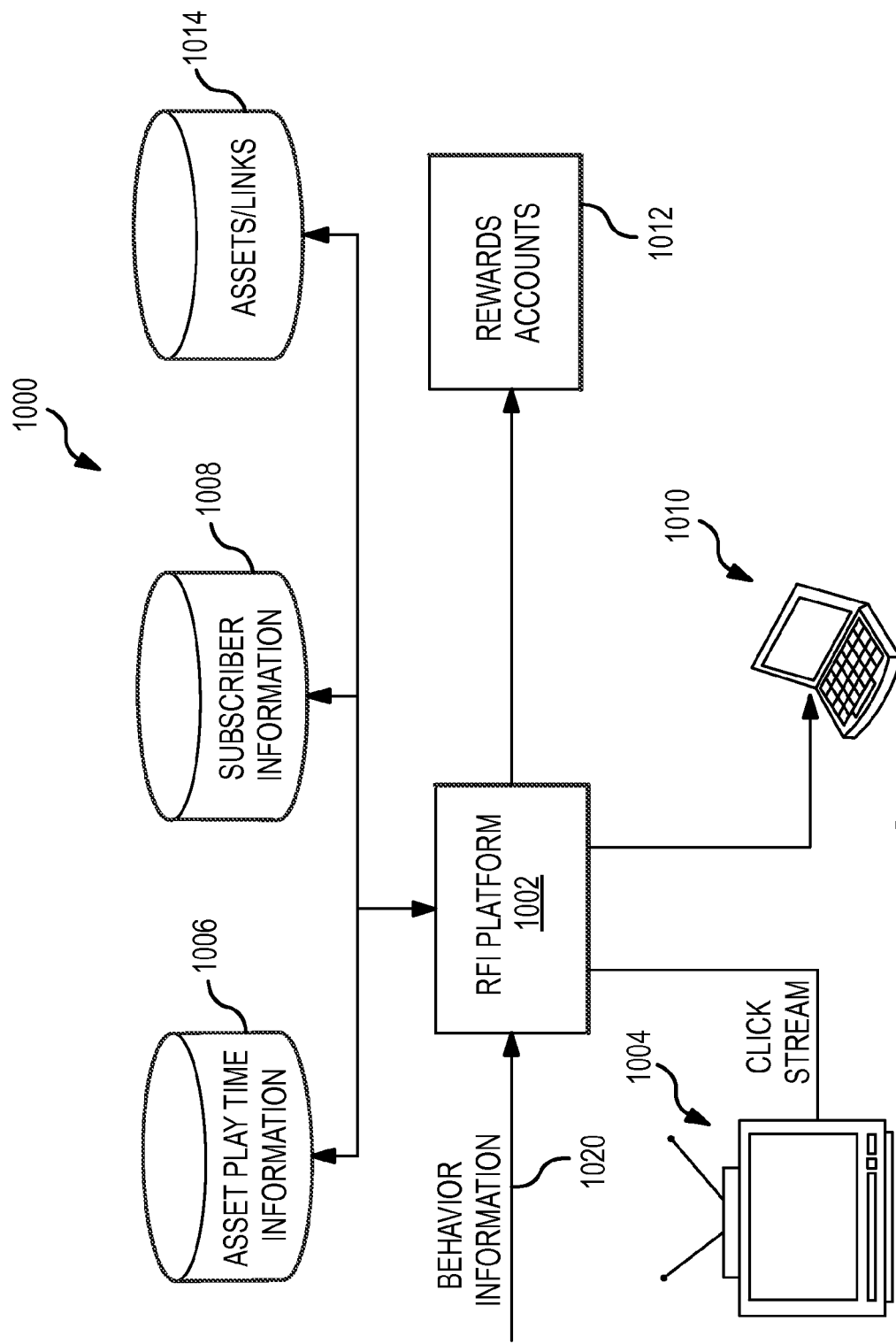
FIG. 8 illustrates a request for information system in accordance with the present invention.

FIG. 8 illustrates a request for information (RFI) system 1000 in accordance with the present invention. The system allows users of one communications network (e.g., a cable television network or a data network such as the internet) to provide information useful for targeting assets or follow-on information in another network (e.g., a data network or cable television network). Thus, for example, information regarding viewing habits or classification parameters developed in connection with a cable television targeted advertising system may be used to target banner ads or other assets or follow-on information delivered during an internet session of an associated network user. Conversely, information developed from analyzing internet usage may be utilized to target assets via the cable television network. In this regard, the targeted advertising system provides direct value to asset providers as well as the MSOs that enable the targeted asset delivery system. For instance, information regarding viewing habits and/or classification parameters that the MSOs develop in the process of enabling the targeted asset delivery system may be used to assist asset providers including both advertisers and programming providers in targeting assets or follow-on information within separate networks and/or modalities (e.g., access via a web-portal, telephone, direct mailing, e-mail). This provides the MSOs with an additional revenue opportunity and encourages them to enable the targeted asset delivery system.

In particular, it has been recognized that some network users have different usage modes associated with different networks. For example, when watching television, a user may prefer that interactive requirements and interruptions to programming be kept to a minimum. The same user may be interested in actively selecting information, and delving deeper into available content during a data network session. An asset provider may wish to take advantage of both modes, for example, by providing a rich and alluring video asset via television followed by more detailed product information in an interactive context during a subsequent data network session using a data terminal (e.g., a computer, a PDA, a data enabled phone, etc.).

This strategy may be particularly effective and inoffensive where the user has expressly indicated an interest in receiving the follow-on information. The system 1000 of FIG. 8 shows one architecture for executing this functionality. The system 1000 includes an RFI platform 1002 in communication with a user equipment device 1004 of a cable television network and a data terminal 1010. It will be appreciated that, although a single platform 1002 is shown for purposes of illustration, the associated functionality may be distributed over multiple platforms. Moreover, though a single device 1004 and a single terminal 1010 are shown, the platform can service many devices and terminals within a network environment.

In addition, though the system 1000 is described below in relation to a common user of the single device 1002 and the single terminal 1010, it will be appreciated that a variety of usage patterns are possible. For example, the device 1004 may be used by multiple members of a household. Those household members may or may not also be users of the terminal 1010. In some cases, multiple household members who use the device 1004 (concurrently or separately) may have separate terminals 1010. Conversely, multiple users of a terminal 1010 may have separate devices 1004. Also, each device 1004 and terminal 1010 may be associated with a set of multiple users, which sets may be the same or different. It should also be appreciated that the device 1004 and terminal 1010 may be at the same location (e.g., a residence) or different locations (e.g., one at home and the other at an office or a mobile device).

In one implementation of the present invention, a user or users of the device 1004 receive a first asset on the device 1004 and receive a second, follow-on asset via the terminal 1010. For example, the first asset may be a product placement ad, a commercial presented during a commercial break, or an entire television program. The second asset may be product information delivered by e-mail or an e-mailed link to interactive content. Alternatively or additionally, the follow-on asset may be made available through a centralized web-portal, delivered to the device 1004 (e.g., to be stored for later delivery or on a dedicated asset channel), or delivered via the mail or by phone.

In the illustrated implementation, little or no user input may be required to initiate delivery of the second asset. For example, when the targeted advertising system reports that a particular user or users (e.g., as estimated by an audience classifier) have consumed an asset, the system may prompt delivery of the second asset.

Alternatively, a user watching programming including a product placement ad, watching other programming such as a weather report or history themed programming, or watching an ad during a commercial break may provide an input to request further information (an "RFI input") as part of an opt-in or subscriber RFI program. The RFI input may be entered, for example, by pressing a designated remote control key. This RFI input may be responsive to a prompt (e.g., a pop-up message or an RFI icon that has been embedded in the content and that indicates that information is available) or sua sponte. In one embodiment, the asset provider embeds an RFI icon within the asset during either the post-production activities for pre-recorded assets or the production activities for live broadcast assets. The RFI icon conveys that the asset is RFI enabled and prompts users to enter an RFI input to request follow-on information relating to the asset being viewed. The RFI icon may indicate the type of follow-on information that is available for the particular RFI enabled asset (e.g., display a music cleft for information relating to music, a dollar sign for coupons or financial incentives, and so on). Alternatively, the asset may include a generic RFI icon.

To subscribe to the program, users may voluntarily create an account on, for example, a rewards accounts platform 1012 made available through access to a centralized web-portal or simply a web-portal configured to maintain user accounts. In creating the account, the user may provide a variety of information including contact information (e.g., e-mail address, mailing address, telephone number), demographic information (e.g., gender, age, ethnicity, geographical location, annual income, marital status), and information relating to the user's consumer preferences, family and friends, and privacy permissions or consents.

To educate users regarding the RFI system, including the functionality of the RFI icon and how users may opt-in to the RFI program, the MSO may run information commercials or announcements explaining the system and its operation. Alternatively, asset providers may incorporate announcements into their scheduled programming in which users are instructed to press the appropriate button on the remote when an RFI icon appears on the screen to receive related follow-on information and, if the user has not already done so, to log on to a specified website or web-portal to subscribe to the RFI program.

In this manner, the second asset or follow-on information may be delivered to the user based on a single input, thus requiring minimal interaction by the user and entailing little or no interruption of the current television programming/asset. However, if desired, additional interaction can be accommodated. For example, after the user has entered an initial RFI input, the user may be prompted to enter additional information, e.g., via a menu using arrow and enter keys. Such information may include: (1) identifying the user or users requesting the second asset or information; (2) identifying the modality or terminal(s) for delivery of the information; (3) identifying the information desired (e.g., where multiple items of information are associated with the time of the RFI input such as when a product placement ad occurs during travel programming; or (4) identifying a third party or parties (e.g., from a friends and family list of consenting/participating network users) to whom the information should be sent. Many other types of inputs may be supported.

Based on such inputs, information is transmitted from the device 1004 to the RFI platform 1002. This information may be raw click stream information or processed information (e.g., an RFI message) based on the RFI input. In either case, the RFI platform 1002 uses this information to determine the time of the input (which may be the current time if the click stream information is concurrently transmitted to the platform 1002) and the channel to which the user was tuned at the time of the input. The platform 1002 may also process this information to determine demographic or other user classification information, or to estimate the size and/or composition of an audience to optimize future time-slot ad buys. Alternatively, the message may include an asset identifier for the asset and/or a user identification and/or classification information about the user.

The RFI platform 1002 then uses this information to access an asset play time information database 1006. This database 1006, which may be constructed using information from asset providers (e.g., advertisers, programming networks), network providers (e.g., MSOs), equipment (e.g., head ends) and other sources, identifies what assets played on what channels at what times. The database can thus be used to associate the RFI input with a first asset to which it pertains and, optionally, to a second (presumably related) asset or asset link to be delivered to the terminal 1010. This second asset or link can then be retrieved from an asset/links database 1014. It will be appreciated that the assets/links database 1014 can be accessed based on a second asset identifier, a first asset identifier or any other suitable information. Moreover, though multiple databases are depicted, any suitable data structure including a simple database or multiple databases, on a single or multiple machines, at a single or multiple locations, can be utilized. Moreover, rather than sending an e-mail or link to the user, this information may be used by a targeted asset system of a data network (e.g., the internet) or of a particular site (e.g., a search engine) to target banner ads or other assets during a data network session of user. It will be appreciated that such interest or targeting information may be shared both ways as between the data network targeting system and the television network targeting system.

The subscriber information database 1008 includes various information relating to the network users. This information may include, for example, contact information (e-mail address, physical address, phone number, etc.), privacy information such as any consents or refusals to be contacted via specified modes, by specified providers, at specified times or with specified kinds of information and promotions, friends and family lists, demographic information, loyalty program information, and the like. For example, an e-mail address may be extracted from the subscriber information database in order to send the second asset to the terminal 1010. The information contained in database 1008 may be provided by the user, for example, during the process of setting up a user account or it may be gathered from third parties (e.g., credit card companies, credit reporting agencies) in accordance with the user's privacy permissions.

Figure 9:
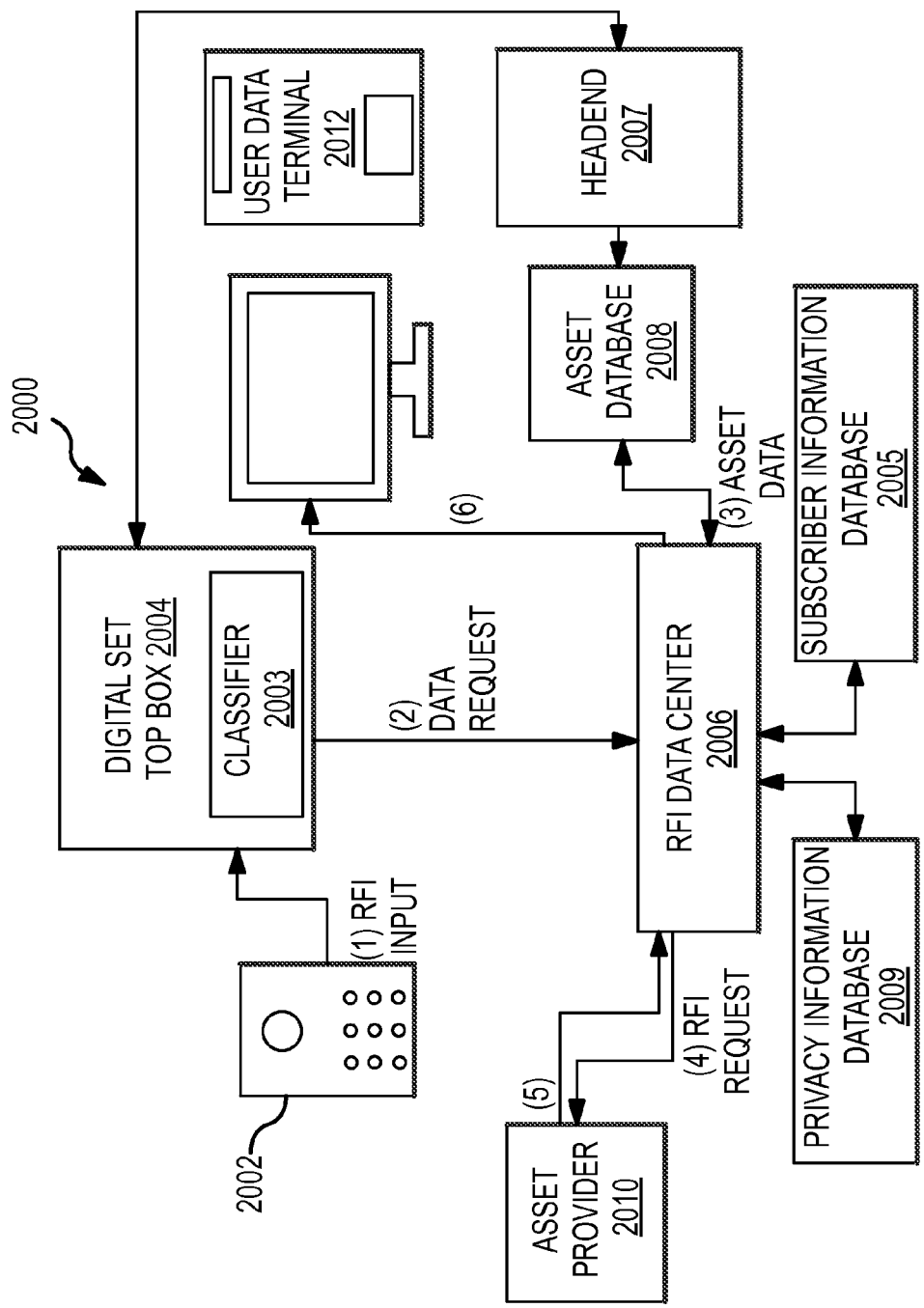
FIG. 9 illustrates a request for information implementation in an exemplary implementation of a digital cable television network.

FIG. 9 shows a flow diagram of an exemplary application of an RFI system 2000 in the context of a digital cable television network and internet application. The illustrated process initiates when the viewer enters an RFI input to the digital set top box using the user remote 2002 (1). For example, the user remote 2002 may include a designated RFI input button or a particular code may be entered. As discussed above, the asset currently being displayed may include an RFI icon or prompt instructing the user to enter a particular button or code to receive more information. The remote 2002 may be a multi-purpose, commercially available remote control or it may be a specialized remote.

Based on this RFI input, a digital set top box 2004 transmits a data request to an RFI data center 2006 (2). This data request may include, for example, an identifier for the digital set top box, the date and time of the RFI input, the network to which the digital set top box was tuned at that time (which may be a programming network, an ad channel, or a channel identifier) and, optionally, an asset identifier and/or information concerning "who's watching now." As discussed above, the information concerning who's watching now may be determined by operation of a classifier 2003 of a targeted asset delivery system.

The RFI data center 2006 also receives asset data from an asset database 2008 (3), which may be controlled by a network provider (e.g., an MSO). For example, the asset database 2008 may include tables providing information concerning what assets were broadcast from a headend 2008, what channels and at what times those assets were broadcast, and more particularly, what assets were selected for viewing at each digital set top box 2004. In a targeted asset delivery system, the asset database 2008 may include asset delivery information pertaining to each digital set top box 2004 in the broadcast network, rather than each programming network channel broadcast over the network, because the assets selected for each set top box 2004 may vary according to the classification parameters of the household or of a specific user within the household that the classifier 2003 has determined to be present. The information contained in the asset database 2008 can be used together with the request information from the digital set top box 2004 to associate the RFI input with a particular asset.

Once the RFI input has been associated with a particular asset, an RFI request is transmitted to the appropriate asset provider 2010 (4). Thus, for example, an automobile manufacturer such as General Motors ("GM") may purchase a particular asset spot during a given program. As described above, a targeted advertising system may operate in spot optimization mode to deliver specific GM ads to appropriate viewers during the time period of that spot. Accordingly, one demographic group may receive a sports car ad from GM whereas another demographic group may receive a minivan ad during that spot. These different GM ads may be broadcast on different ad channels in synchronization with the spot. The targeted ad actually delivered to a particular set top box 2004 is then reported to the RFI data center 2006, as discussed above. As a result, the RFI request identifies a specific ad that was of interest to the user and for which the user has requested additional information.

The RFI request sent to the asset provider may also be augmented with a profile associated with the household or, in a targeted asset delivery system that incorporates the classifier 2003, with a specific user "who's watching now." For example, the RFI data center 2006 may access stored subscriber information (e.g., demographic information, consumer preference information) from a subscriber information database 2007. The subscriber information may be provided by the user during the opt-in process or gathered from third-party sources (e.g., credit reporting agencies, asset provider mailing lists) and may be used to construct a user profile that contains information of interest to the asset provider. Continuing the GM example above, GM may contract to receive RFI requests that include income and recent purchasing behavior information relating to the user initiating each RFI input. Thus, the RFI request transmitted to the asset provider 2010 (4) may include information regarding the user's $250,000 annual income and the user's purchase of a Cadillac Escalade during the previous year.

In one embodiment, the MSO may employ a privacy database 2009 to ensure user privacy. In this embodiment, the RFI request contains only general profile information relating to the user, not personally identifiable information that would allow the asset provider to contact, or otherwise identify, the user directly. The privacy database may incorporate MSO privacy policies, government mandated privacy regimes, as well as user-defined privacy consents and permissions provided during the opt-in process. In another embodiment, personally identifiable information (e.g., name, mailing address, e-mail address, telephone number) may be provided directly to the asset provider with the RFI request where privacy policies allow. In these cases, the asset provider may contact the user directly.

Based on the RFI request, the asset provider 2010 can provide, for example, an asset package or follow-on information back to the RFI data center 2006 (5) that is tailored for the particular user. Thus, GM may have various asset packages associated with various vehicles. GM can then report back to the RFI data center 2006 an asset package corresponding to the specific asset identified by the viewer or tailored to the user profile for that user, in this case, an asset package containing follow-on information targeted to high-income earners that are not currently GM customers. The RFI data center 2006 may then provide the follow-on asset package to a user data terminal 2012 (6), for example, via access to a web-portal or via e-mail. In a subsequent data network session, the user may access the e-mail or web-portal to interactively obtain the information requested. If the user subsequently purchases an associated product, in this case, a GM vehicle, the purchase may be reported to the RFI data center 2006, as discussed in greater detail below. While the example discussed above relates to an advertisement delivered during a break in broadcast network programming, it should be noted that the RFI system is applicable to any RFI enabled asset, which may include advertisements as well as pre-recorded or live programming such as television shows or movies, music, sports, news, and much more.

B. Encouraging and Verifying Asset Consumption

Current technologies make it possible for users of communication networks to skip assets. In the case of broadcast networks, such as cable television networks, users may use DVRs or PVRs to manually fast-forward through assets contained in pre-recorded programs or they may employ commercial-skipping software to automatically record network programming without assets. Because many users prefer to view programming without commercial interruption, many users of broadcast television networks choose not to consume assets. This is undesirable because, as discussed above, programming providers in ad-supported networks are compensated, at least in part, by asset delivery revenues. These revenues subsidize the significant cost of providing programming and lower or eliminate associated user fees. Because the cost to air a given asset generally rises as the size of the audience increases, the practice of skipping assets has the potential to undermine the business model that makes ad-supported content dissemination viable. While this is a concern to asset providers, network operators, and programming providers, it is also a concern for users who have come to expect advertiser subsidization of the costs of making content available via communications networks.

Nonetheless, it is believed that many users may be willing to receive and consume assets (e.g., first and second/follow-on assets and information) if provided sufficient economic motivation. In this regard, the RFI system includes a mechanism for encouraging asset consumption in order to further improve the effectiveness the targeted asset delivery system so as to fully realize the benefits of ad-supported programming, discussed above. Such a mechanism involves offering monetary remuneration in exchange for the verified consumption of first and/or second assets. This monetary remuneration may take several forms, including, for example, direct payment, network service credits and/or upgrades, cash or merchandize prizes, product and/or service discounts from participating asset providers, and the like.

Generally, a consumer loyalty or rewards program may be based on verified asset consumption and/or requests for follow-on assets or information. For example, a rewards account may be established for all network users or a portion of participating network users. Then each user's consumption of assets may be verified, and the associated rewards account may be credited value based on the verified consumption of assets.

In the context of a first asset delivered via a cable television network, an MSO may establish an account for each network user. Then a user equipment device may verify the consumption of assets by monitoring user inputs at the user equipment device, and in response, the rewards account associated with the user equipment device may be credited value based on the verified consumption of assets shown at the user equipment device and/or based on additional user inputs to the user equipment device, made at or near the time of asset delivery, that indicate a network user's request for or consent to receive follow-on information via another network and/or modality. Credits to network users may include, for example, credits against the network user's bill, credits towards upgrades or extras (e.g., fee based services such as VOD programs), credits towards a threshold for receiving an award such as one-month of free services, or credits towards a third party or affiliate rewards program (e.g., frequent flyer miles, Upromise accounts, purchasing points and/or discounts with participating venders, etc.).

Additionally or alternatively, asset skipping events can be recorded and reported so that network users electing to skip assets may be appropriately billed (or have their existing bill adjusted) to compensate for the value that the asset provider is notionally diminished by the asset skip event. Such recording and reporting of asset skip events, calculation of an appropriate amount of compensation, and billing of network users for such asset skip events is described in co-assigned and copending U.S. patent application Ser. No. 12/024,714, entitled "Verifying and Encouraging Asset Consumption in a Communications Network" and having a filing date of Feb. 1, 2008, the entire contents of which are incorporated by reference herein.

The loyalty or rewards program also contemplates a lottery reward system in which a sweepstakes-type prize (e.g., money, product(s)) may be awarded to a network user or users that are randomly selected at or around the time that an asset is being consumed. For example, a randomly selected network user that has consumed an entire asset may receive a prompt at the close of the asset indicating that the user should respond with a certain input to the user equipment device. If the network user responds accordingly, the rewards account associated with the user equipment device may be credited value based on the user's input or the user may be given further instruction regarding claiming and receiving the prize via the contact information (e.g., e-mail, mailing address, telephone number) associated with the rewards account. Because network users must consume assets to be selected as a winner, network users are encouraged to consume assets out of a desire to be included in the group of eligible candidates.

The consumer loyalty or rewards program discussed above may also be used to encourage network users to provide valuable classification information and/or to consume second or follow-on assets. For example, network users may opt-in or consent to collection of information out of a desire to participate in the program or to improve asset targeting. In this regard, network users may provide contact information, demographic or lifestyle information, product interests, or other information in a registration process associated with the loyalty or rewards program. Further, and as discussed above, network users may request or agree to receive follow-on assets through a separate network (e.g., the internet or e-mail) or via another modality (e.g., contact by phone or mail) in exchange for incentives offered through the loyalty or rewards program.

In addition, the information acquired in connection with such a consumer loyalty or rewards program may have value for other applications. For example, in verifying asset consumption by monitoring user inputs at the user equipment device, the system may accumulate information regarding which network users have consumed what assets, how many consumers have elected not to consume an asset and/or what level of interest was indicated by consumers (e.g., a click stream may indicate a high likelihood that a user was present, an intentional dwelling on the asset, a muting or reduced volume for the asset, etc.), and which users expressed interested in receiving follow-on information relating to a particular asset. All of this information, regardless of whether it is accumulated during the process of verifying asset consumption to carry out the rewards program or voluntarily provided by network users in order to participate in the rewards program, may be used to value asset delivery, to analyze the effectiveness of an ad campaign, or to better understand the target audience for an asset, and therefore, the target market for a product.

FIG. 8 illustrates the integration of the rewards program into the RFI system 1000. Specifically information recorded at user equipment devices 1004, 1010 may be provided to the RFI platform 1002. This information may include user inputs relating to asset consumption or skip events or to requests for follow-on information. Accordingly, this information may be processed and sent to a rewards accounts platform 1012 such that network users may be credited based on consumption of assets or billed appropriately based on asset skipping. In addition, value may be credited to a rewards account in connection with receiving a second asset or sending an asset to others on the network user's friends and family list. In this regard, information reflecting such activities is reported to platform 1012 for recording purposes.

C. Acquiring Consumer Behavior Information

The RFI platform 1002 may also receive consumer behavior information 1020. This consumer behavior information 1020 may include any kind of information of interest to content providers, including asset and programming providers or others to, for example, close the loop concerning analysis of asset or follow-on information effectiveness. For example, the behavior information 1020 may relate to purchasing decisions made by consumers after viewing a first asset and/or a second or follow-on asset. Such information may be acquired from a third party database such as, for example, a credit card company, credit agency, or a credit card transaction processing service. Consumer behavior information 1020 may also be reported to the RFI platform 1002 by asset providers and/or associated vendors or retailers that are able to track purchases through the use of loyalty numbers or member IDs that are associated with participating network users' loyalty or rewards program accounts. Further, network providers such as MSOs could partner with third-party consumer marketing services or affiliate program providers that monitor member purchases made with participating asset providers and/or retailers. Alternatively, consumers may report transaction information directly to the RFI platform 1002.

D. Correlating Asset Consumption to Consumer Behavior Information

Once asset consumption has been verified and consumer behavior information has been collected, as discussed above, the RFI platform 1002 can correlate such consumer behavior information to asset consumption information so as to identify instances where, for example, a consumer has purchased a product after consuming a first asset and/or a second or follow-on asset related to that product. This will allow asset providers to close the loop regarding the effectiveness of assets and to develop improved metrics for analyzing the effectiveness of assets.

Additionally, the ability to statistically correlate asset consumption with consumer purchasing behavior allows for other revenue models in relation to asset delivery. For example, as part of the loyalty or rewards program, not only network users/consumers, but also programming networks, network operators or other parties may receive an additional element of remuneration in cases where a product is purchased after assets have been consumed. For example, the network user/consumer may receive a discount in relation to the purchase or in relation to a bill for network usage. In addition, one or more of the programming networks, network affiliates or network operators (e.g., MSOs) may receive additional revenues associated with delivery of assets that result in purchasing decisions.

E. System Operation

Figure 10:
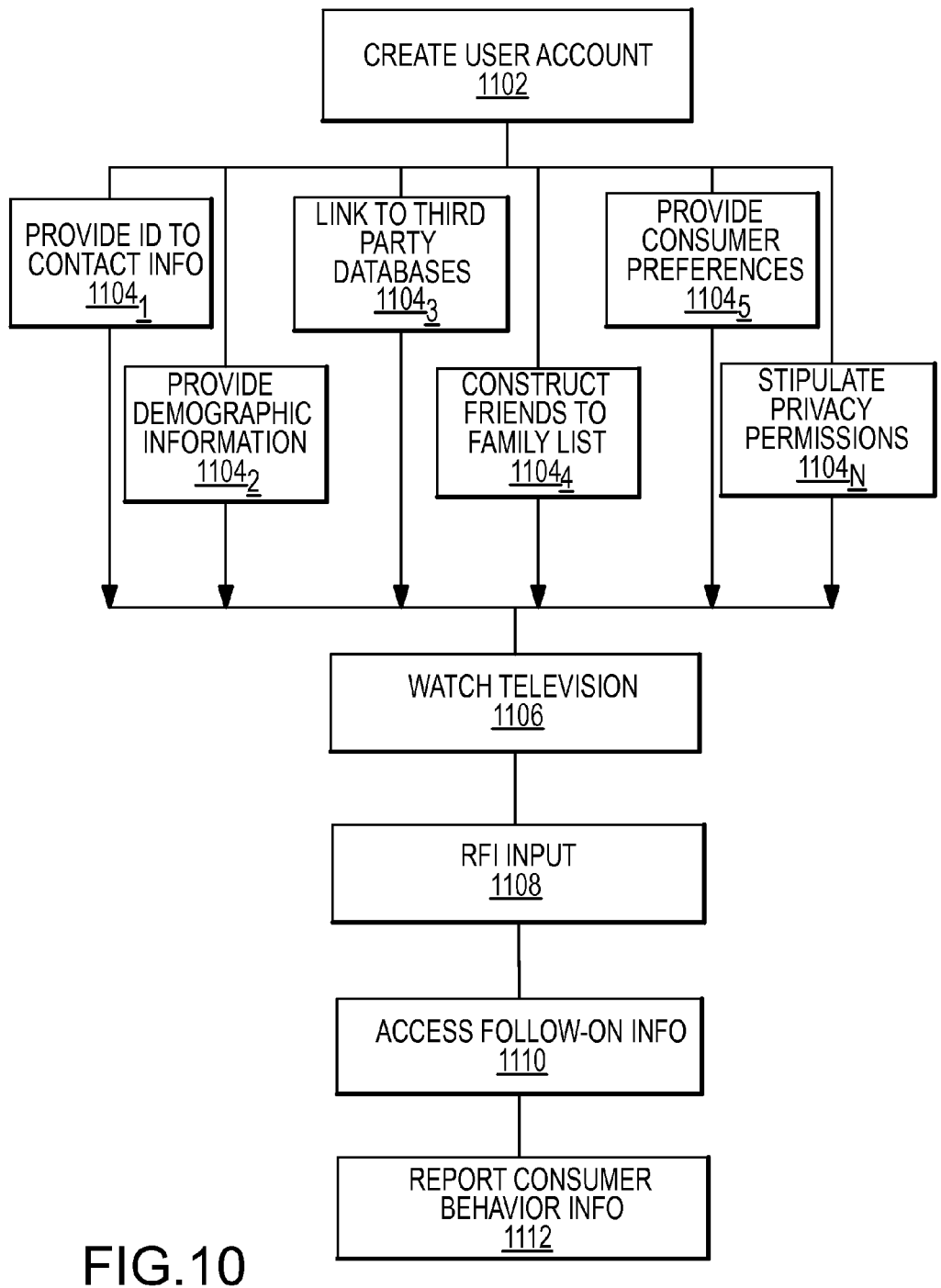
FIG. 10 provides a flow chart that illustrates the functionality of an exemplary request for information system from a user's perspective.
Figure 11:
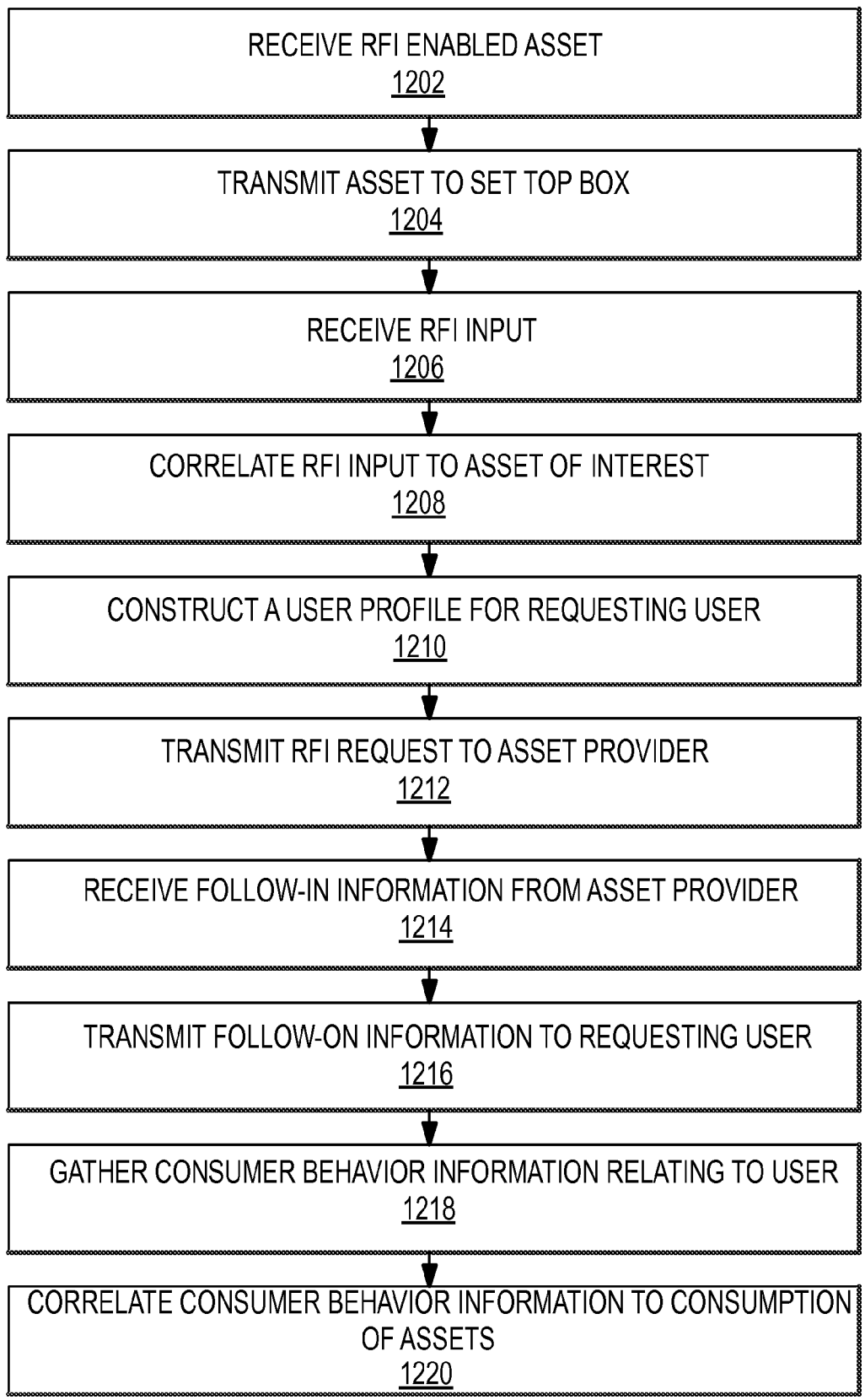
FIG. 11 provides a flow chart that illustrates the functionality of an exemplary request for information system from the perspective of a multiple systems operator.

FIGS. 10 and 11 provide flow charts that summarize the functionality of the RFI system from the perspective of a user and an MSO, respectively. Referring to FIG. 10, a user initially opts-in or subscribes (1102) to the RFI program by creating a user account (1102). During the process of creating the user account, the user provides user identification and contact information ($1104_1$). The user also selectively provides a variety of demographic information ($1104_2$) including, for example, the user's gender, age, ethnicity, marital status, and income level. The user may also choose to link the account to various third-party databases and/or affiliate programs ($1104_3$). For instance, the user may choose to link the account to his or her Visa card such that all Visa purchases are automatically reported to the user's account so that the user may be credited value in conjunction with a rewards or loyalty program, as discussed above. In another example, the user may link the account to participating online asset providers (e.g., Target, Dell, Apple) through which the user may receive discounts. The user may also construct a friends and family list ($1104_4$) that identifies individuals who might be interested in receiving RFI information from the user or from the RFI system. The user may also detail consumer preferences ($1104_5$) regarding a variety of goods and services. Finally, the user may stipulate privacy permissions ($1104_n$) regarding the user's personally identifiable information and the parameters surrounding the user's agreement to be contacted by the MSO or third parties (e.g., which parties may contact the user, how the user may be contacted, what user information may be provided to third parties). It should be noted that this list is not exhaustive and the invention contemplates the provision of any appropriate information to better enable the RFI system.

After the user creates an account, the user watches television (1106) according to the user's normal patterns. When viewing an RFI enabled asset of interest, the user presses the appropriate RFI button on the remote control when the RFI icon (1108) appears on the screen (e.g., provides an RFI input) to indicate an interest in receiving follow-on information relating to the asset. When ready to review one or more sets of follow-on information that have been provided in response to the user's RFI inputs, the user logs on to his or her user account and accesses the follow-information via a web-portal (1110). Alternatively, and depending on the user's preferences, the user may receive the follow-on information via e-mail, mail, or telephone. To close the loop in relation to the user's consumption of RFI enabled assets and follow-on information, the user may choose to directly report the user's consumer behavior information (1112) in exchange for value credited to the user's account as part of a rewards or loyalty program.

FIG. 11 summarizes the functionality of the RFI system from an MSO's perspective. The MSO initially receives an RFI enabled asset to be broadcast over the broadcast television network (1202). The asset may include an embedded RFI icon to indicate to users that follow-on information is available in relation to the asset. As discussed above, the RFI icon may convey the type of follow-on information that is available (e.g., music, data, discounts) or it may be general such that the user may stipulate the type of information that is desired at the time the user accesses or retrieves the follow-on information. In addition, while the asset provider may insert or embed the RFI icon during production of the asset, the MSO or any other appropriate party may also insert the RFI icon.

Once the MSO receives an RFI enabled asset, it transmits the RFI enabled asset to a set top box that corresponds to a subscribing user (1204) via the broadcast television network. In turn, the MSO receives an RFI input from the user (1206). The RFI input indicates that the user is interested in receiving follow-on information in relation to the RFI enabled asset. Next, the MSO consults the RFI input as well as an asset database containing asset delivery information pertaining to the set top box to correlate the RFI input to the asset that was being viewed at the time of the RFI input (1208), or to identify the asset of interest. Optionally, the MSO may consult a subscriber information database to build a user profile for the requesting user (1210). The user profile may correspond to the user's household or, in a targeted asset delivery system that incorporates a classifier, the user profile may correspond to the user or users actually present at the time of the RFI input. The user profile may be filtered according to various privacy regimes (e.g., government mandated, user specified, MSO policy) set forth in a privacy information database. Because the user profile contains demographic and consumer preference information relating to the consumer, the profile provides a valuable statistical data point to assist the asset provider in discerning the type of user or users that consume the asset provider's assets and/or products.

In addition, a user's RFI input might be ambiguous. For instance, it may correspond to more than one asset or the input might have been made when there is no RFI icon shown on the screen. In this case, it may be desirable to use the web-portal or an e-mail request to gather further information from the user to assist the system in determining the related asset. In one possible implementation, the user may be presented with a frame of video that was captured at the approximate time that the user entered the RFI input.

Once the asset of interest has been identified, the MSO transmits to the asset provider an RFI request specifying the asset of interest and, if applicable, the user's profile (1212). In response, the MSO receives a package of assets or follow-on information from the asset provider for delivery to the user (1214). The MSO transmits the package of assets or follow-on information to the user (1216) via any appropriate means of communication. For example, the follow-on information may be provided to the user via access to a centralized web-portal operated in conjunction with the user's account or the follow-on information may be transmitted to the user via e-mail (e.g., a web link provided in an e-mail), mail, or by telephone.

After transmitting the follow-on information, the MSO may gather consumer behavior information relating to the user (1218). The consumer behavior information may be derived from a variety of sources, including, for example, direct reporting from the user, tracking of memberships and/or loyalty accounts the user has established with asset providers and linked to the RFI system (e.g., a Safeway club card, an REI membership, a Costco membership), and partnering with third parties that maintain databases of consumer information (credit card companies, credit reporting agencies, affiliate programs). Once consumer behavior information has been collected, the MSO may statistically correlate information relating to the user's consumption of assets (both RFI enabled assets and follow-on information) with the user's consumer behavior information (1220) to gain information regarding asset effectiveness and impact on consumer behavior information.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. An apparatus for use in providing information to dual-users of a broadcast network and a unicast network such as a data network or a telephone network, comprising:
   1) a broadcast network platform, adapted for communication with a plurality of user equipment devices corresponding to at least some of said dual-users via said broadcast network, for use in receiving information requests from said plurality of user equipment devices, said broadcast network platform being separate from said plurality of user equipment devices;
   2) a unicast network platform, adapted for communication with a plurality of network devices corresponding to at least some of said dual-users via said unicast network, for use in providing access to items of information responsive to said information requests, said unicast network platform being separate from said plurality of network devices; and 3) a request for information (RFI) system, adapted for communication with said broadcast network platform and said unicast network platform, for processing said information requests received from said plurality of user equipment devices via said broadcast network platform and providing access to said items of information by said plurality of network devices via said unicast network platform, said RFI system comprising one or more processors operative for:
  a) receiving a first information request comprising click stream information from a first user equipment device, wherein said click stream information is associated with a particular asset by referencing a database of content information to identify content being consumed on the first user equipment device when said first information request was made, wherein said first information request is transmitted from said first user equipment device to said broadcast network platform at least in part by a broadcast communication pathway in said broadcast network;
  b) processing said first information request to identify a first user associated with the first information request and a first item of information responsive to said first information request providing further information regarding subject matter of the particular asset;
  c) using one or more data repositories to identify at least a first audience classification parameter associated with said first user, said first audience classification parameter for use in associating said first item of information responsive to said first information request with said first user; and
  d) based on said step of using, and free from interference with delivery of broadcast content to said first user, providing instructions, independent of said first user equipment device, for enabling said first user to access said first item of information via said unicast network platform.

2. An apparatus as set forth in claim 1, wherein said broadcast network platform and said RFI system are disposed at separate locations.

3. An apparatus as set forth in claim 1, wherein said unicast network platform and said RFI system are disposed at separate locations.

4. An apparatus as set forth in claim 1, wherein multiple users are associated with at least one user equipment device of said plurality of user equipment devices, and said RFI system is operative for identifying one of said multiple users associated with a given information request and making responsive information available to the one of said multiple users via said unicast network.

5. An apparatus as set forth in claim 1, wherein said RFI system is operative for providing said first user access to said first item of information by providing a response to a first network device of said first user via a unicast communication pathway separate from said broadcast communication pathway.

6. An apparatus as set forth in claim 1, wherein said first item of information is output to said first user via one of access through a web-portal, e-mail, or telephone.

7. An apparatus as set forth in claim 1, wherein said first information request is entered by said first user in connection with an advertisement.

8. An apparatus as set forth in claim 1, wherein said RFI system is configured to receive, from said first user equipment device, one or more signals regarding a consumption status of first broadcast content.

9. An apparatus as set forth in claim 8, further comprising a rewards system for establishing a rewards account for a broadcast network user, wherein value is credited to said rewards account based on one of said consumption status of said first broadcast content or said input from said broadcast network user.

10. An apparatus as set forth in claim 9, further comprising a module for collecting consumer behavior information associated with said broadcast network user.

11. An apparatus as set forth in claim 10, wherein value is credited to said rewards account based on said consumer behavior information.

12. An apparatus as set forth in claim 10, wherein said module includes a processor operative to correlate said consumer behavior information with one of said consumption status of said first broadcast content or said input from said broadcast network user.

13. An apparatus as set forth in claim 1, wherein said click stream information comprises timestamp, button selection, and bandwidth segment data from the first user equipment device.

14. An apparatus as set forth in claim 1, wherein
  1) the broadcast network platform is adapted for communication with the plurality of user equipment devices corresponding to at least some of said dual-users via said broadcast network, for use in providing access to items of information responsive to said information requests, said broadcast network platform being separate from said plurality of user equipment devices;
  2) the unicast network platform is adapted for communication with a plurality of network devices corresponding to at least some of said dual-users via said unicast network, for use in receiving information requests from said plurality of network devices, said unicast network platform being separate from said plurality of network devices; and
  3) the request for information (RFI) system is adapted for communication with said broadcast network platform and said unicast network platform, for processing said information requests received from said plurality of network devices via said unicast network platform and providing access to said items of information by said plurality of user equipment devices via said broadcast network platform, said RFI system comprising one or more processors operative for:
    a) receiving a second information request from a second network device, wherein said second information request is transmitted from said second network device to said unicast network platform at least in part by a unicast communication pathway in said unicast network;
    b) processing said second information request to identify a second item of information responsive to said second information request; and
    c) providing, independent of said first network device, said second item of information via said broadcast network platform.

15. A method for use in providing information to dual-users of a broadcast network and a unicast network such as a data network or telephone network, comprising:
  providing a request for information (RFI) system adapted for communication with a broadcast network platform associated with a plurality of user equipment devices of said broadcast network and with a unicast network platform associated with a plurality of network devices of said unicast network, said RFI system being operative for processing information requests received from said plurality of user equipment devices via said broadcast network platform and providing access to items of information by said plurality of network devices via said unicast network platform;

operating said RFI system to process a first information request comprising click stream information from a first user equipment device to:
  a) associate said click stream information with a particular asset by referencing a database of content information to identify content being consumed when said first information request was made,
  b) use one or more data repositories to identify a first user associated with the first information request; and
  c) identify a first item of information responsive to said first information request providing further information regarding subject matter of the particular asset, wherein said first information request is transmitted from said first user equipment device to said broadcast network platform at least in part by a broadcast communication pathway in said broadcast network;

operating said RFI system to use one or more data repositories to identify at least a first audience classification parameter associated with said first user for use in associating said first item of information responsive to said first information request with said first user; and operating said RFI system, free from interference with delivery of said broadcast content to said first user, to provide instructions, independent of said first user equipment device, for enabling said first user to access the first item of information via said unicast network platform.

16. A method as set forth in claim 15, wherein said broadcast network platform and said RFI system are disposed at separate locations.

17. A method as set forth in claim 15, wherein said unicast network platform and said RFI system are disposed at separate locations.

18. A method as set forth in claim 15, wherein multiple users are associated with said first user equipment device, and said RFI system is operative for identifying one of said multiple users associated with a given information request and making responsive information available to the one of said multiple users via said unicast network.

19. A method as set forth in claim 15, wherein said RFI system is operative for providing said first user access to said first item of information by providing a response to a first network device of said first user via a unicast communication pathway separate from said broadcast communication pathway.

20. A method as set forth in claim 15, wherein said first item of information is output to said first user via one of access through a web-portal, e-mail, or telephone.

21. A method as set forth in claim 15, wherein said first information request is entered by said first user in connection with an advertisement.

22. A method as set forth in claim 15, wherein said RFI system is configured to receive, from said first user equipment device, one or more signals regarding a consumption status of first broadcast content.

23. A method as set forth in claim 22, further comprising establishing a rewards account for a broadcast network user, wherein value is credited to said rewards account based on one of said consumption status of said first broadcast content or said input from said broadcast network user.

24. A method as set forth in claim 23, further comprising collecting consumer behavior information associated with said broadcast network user.

25. A method as set forth in claim 24, wherein value is credited to said rewards account based on said consumer behavior information.

26. A method as set forth in claim 24, further comprising operating a processor to correlate said consumer behavior information with one of said consumption status of said first broadcast content or said input from said broadcast network user.

27. A method set forth in claim 15, wherein said click stream information comprises timestamp, button selection, and bandwidth segment data from the first user equipment device.

28. An apparatus for use in providing information to dual-users of a broadcast network and a unicast network such as a data network or a telephone network, comprising:
  1) a broadcast network platform, adapted for communication with a plurality of user equipment devices corresponding to at least some of said dual-users via said broadcast network, for use in selecting targeted assets for transmission to said plurality of user equipment devices wherein targeted assets are targeted to particular subscribers based upon audience classification parameters associated with each subscriber, said broadcast network platform being separate from said plurality of user equipment devices;
  2) a unicast network platform, adapted for communication with a plurality of network devices corresponding to at least some of said dual-users via said unicast network, for use in providing access to items of information corresponding to said targeted assets, said unicast network platform being separate from said plurality of network devices; and
  3) a request for information (RFI) system, adapted for communication with said broadcast network platform and said unicast network platform, for monitoring said targeted assets sent to said plurality of user equipment devices via said broadcast network platform and providing access to said items of information by said plurality of network devices via said unicast network platform, said RFI system comprising one or more processors operative for:
    a) monitoring a first targeted asset sent to a first user equipment device, wherein said first targeted asset is transmitted from said broadcast network platform to said first user equipment device;
    b) identifying a first item of information corresponding to said first targeted asset; and
    c) providing instructions, independent of said first user equipment device, for enabling said first user to access said first item of information via said unicast network platform.

29. An apparatus for use in providing information to dual-users of a broadcast network and a unicast network such as a data network or a telephone network, comprising:
  1) a broadcast network platform, adapted for communication with a plurality of user equipment devices corresponding to at least some of said dual-users via said broadcast network, for use in receiving information requests from said plurality of user equipment devices, said broadcast network platform being separate from said plurality of user equipment devices;
  2) a unicast network platform, adapted for communication with a plurality of network devices corresponding to at least some of said dual-users via said unicast network, for use in providing access to items of information responsive to said information requests, said unicast network platform being separate from said plurality of network devices; and 3) a request for information (RFI) system, adapted for communication with said broadcast network platform and said unicast network platform, for processing said information requests received from said plurality of user equipment devices via said broadcast network platform and providing access to said items of information by said plurality of network devices via said unicast network platform, said RFI system comprising one or more processors operative for:

a) receiving a first information request from a first user equipment device;

b) identifying broadcast content associated with the first information request to select a first item of information responsive to the first information request, wherein the broadcast content associated with the first information request is identified by referencing a targeted asset system to determine which broadcast content was selected by the targeted asset system, based upon audience classification parameters associated with the first user equipment device, for transmission to the first user equipment device at the time the first information request was made; and c) providing instructions, free from interference with delivery of broadcast content to a first user and independent of said first user equipment device, for enabling the first user to access said first item of information via said unicast network platform.

* * * * *